United States Patent
Chic

(10) Patent No.: US 12,492,083 B2
(45) Date of Patent: Dec. 9, 2025

(54) SHUTTLE SYSTEM AND METHOD FOR TRANSFERRING GLASS SHEETS BETWEEN MULTIPLE CONVEYOR SYSTEMS

(71) Applicant: Cardinal IG Company, Eden Prairie, MN (US)

(72) Inventor: Karl Chic, Baraboo, WI (US)

(73) Assignee: Cardinal IG Company, Eden Prairie, MN (US)

( * ) Notice: Subject to any disclaimer, the term of this patent is extended or adjusted under 35 U.S.C. 154(b) by 179 days.

(21) Appl. No.: 18/359,499

(22) Filed: Jul. 26, 2023

(65) Prior Publication Data

US 2025/0033897 A1 Jan. 30, 2025

(51) Int. Cl.
 *B65G 47/57* (2006.01)
(52) U.S. Cl.
 CPC ........ *B65G 47/57* (2013.01); *B65G 2201/022* (2013.01)
(58) Field of Classification Search
 None
 See application file for complete search history.

(56) References Cited

U.S. PATENT DOCUMENTS

| | | |
|---|---|---|
| 3,680,677 A | 8/1972 | Branch et al. |
| 5,238,100 A | 8/1993 | Rose, Jr. et al. |
| 6,505,733 B2 * | 1/2003 | Troupos ................ B65G 47/54 198/840 |
| 7,631,744 B2 * | 12/2009 | Brommer ............... B42C 19/08 198/370.09 |
| 9,475,653 B2 * | 10/2016 | Dugat .................... B65G 13/02 |
| 10,214,366 B2 * | 2/2019 | Milewski ............... B65G 15/12 |
| 10,882,703 B2 * | 1/2021 | Phillips .................. B65G 43/08 |
| 2008/0009229 A1 * | 1/2008 | Sandri .................. B65G 49/067 451/64 |
| 2011/0085878 A1 * | 4/2011 | Balbi .................... B65G 49/061 414/222.01 |
| 2015/0034454 A1 * | 2/2015 | Park ...................... B65G 39/12 198/610 |

FOREIGN PATENT DOCUMENTS

| | | |
|---|---|---|
| CN | 107381048 A | 11/2017 |
| CN | 110342801 A | 10/2019 |
| CN | 111942897 A | 11/2020 |
| CN | 112607390 A | 4/2021 |
| CN | 114194824 A | 3/2022 |
| GB | 1204428 A | 9/1970 |

* cited by examiner

*Primary Examiner* — Kavel Singh
(74) *Attorney, Agent, or Firm* — Fredrikson & Byron, P.A.

(57) ABSTRACT

A shuttle system for transferring glass sheets between multiple conveyor lines. At least two conveyor lines are located crosswise from one another and the shuttle system transfers at least one glass sheet from a first conveyor line to the second conveyor line while the first conveyor line remains operational. A top surface of the glass sheet remains untouched during the conveyance.

36 Claims, 25 Drawing Sheets

SHUTTLE SYSTEM AND METHOD FOR TRANSFERRING GLASS SHEETS BETWEEN MULTIPLE CONVEYOR SYSTEMS

TECHNICAL FIELD

The present disclosure relates generally to equipment and methods for transferring sheets from at least a first conveyor line to at least a second conveyor line located crosswise from the first conveyor.

BACKGROUND

Sheets are often transported along conveyor lines in manufacturing facilities. In some situations, it is desirable to remove the sheets from the conveyor line. This has been done manually, e.g., by workers physically picking-up the sheets and placing them on a nearby rack. It has also been done through automation, e.g., various automated glass stacking systems have been used. Existing systems, however, have limitations. For example, some are limited in terms of their throughput potential. Additionally or alternatively, some automated glass conveyance systems are limited in terms of their ability to move the glass sheets from one conveyor line to another conveyor line especially when the conveyor lines are moving glass sheets in different directions from one another. For example, some systems are limited in terms of their ability to keep the sheets moving while they are being transferred, thus affecting productivity.

Furthermore, in some applications, the top surface of the glass sheet (i.e., surface opposite that of surface in contact with the conveyor line) should not be touched, either by hand or mechanical means such as a suction cup of a robot hand. For example, the top surface of the glass sheet emerging from a tempering furnace should not be touched before it is coated downstream of the tempering furnace otherwise the glass sheet may be damaged.

It would be desirable to provide automated equipment and methods for transferring glass sheets from at least one conveyor line to at least another conveyor line that travels in a different direction in a quick and efficient manner without requiring manual intervention.

SUMMARY

According to an embodiment of the present invention, a glass conveyor system including a first conveyor line, a second conveyor line, and a shuttle system configured to transfer glass sheets from the first conveyor line to the second conveyor line is provided. The first conveyor line includes a plurality of transport rollers configured to convey glass sheets in a first direction and the second conveyor line includes a plurality of conveyor belts configured to convey glass sheets in a second direction, the second direction being crosswise to the first direction. The shuttle system includes a plurality of lifting rollers, the lifting rollers having a retracted configuration and an elevated configuration, such that the lifting rollers when in the elevated configuration are at a higher elevation than the transport rollers of the first conveyor line.

According to another embodiment of the present invention, there is provided a method of operating a glass conveyor system that includes a first conveyor line, a second conveyor line, and a shuttle system configured to transfer glass sheets from the first conveyor line to the second conveyor line. The first conveyor line includes a plurality of transport rollers configured to convey glass sheets in a first direction and the second conveyor line includes a plurality of conveyor belts configured to convey glass sheets in a second direction, the second direction being crosswise to the first direction. The shuttle system includes a plurality of lifting rollers, the lifting rollers having a retracted configuration and an elevated configuration, such that the lifting rollers when in the elevated configuration are at a higher elevation than the transport rollers of the first conveyor line. The method includes the steps of:
  (a) conveying a glass sheet along the first conveyor line in the first direction,
  (b) operating the shuttle system to transfer the glass sheet from the first conveyor line to the second conveyor line by:
    (i) moving the lifting rollers from the retracted configuration to the elevated configuration and thereby lifting the glass sheet off the transport rollers of the first conveyor line,
    (ii) moving the lifting rollers from a first location to a second location, thereby moving the glass sheet from a position above the first conveyor line to a position above the second conveyor line, and
    (iii) moving the lifting rollers from the elevated configuration to the retracted configuration and thereby setting the glass sheet onto the conveyor belts of the second conveyor line, and
  (c) conveying the glass sheet along the second conveyor line in the second direction.

According to still another embodiment of the present invention, a conveyor system including a first conveyor line, a second conveyor line, and a shuttle system configured to transfer sheets from the first conveyor line to the second conveyor line is provided. The first conveyor line includes a plurality of transport rollers configured to convey sheets in a first direction and the second conveyor line includes a plurality of conveyor belts configured to convey sheets in a second direction, the second direction being crosswise to the first direction. The shuttle system includes a plurality of lifting rollers, the lifting rollers having a retracted configuration and an elevated configuration, such that the lifting rollers when in the elevated configuration are at a higher elevation than the transport rollers of the first conveyor line.

According to another embodiment of the present invention, there is provided a method of operating a conveyor system that includes a first conveyor line, a second conveyor line, and a shuttle system configured to transfer sheets from the first conveyor line to the second conveyor line. The first conveyor line includes a plurality of transport rollers configured to convey sheets in a first direction and the second conveyor line includes a plurality of conveyor belts configured to convey sheets in a second direction, the second direction being crosswise to the first direction. The shuttle system includes a plurality of lifting rollers, the lifting rollers having a retracted configuration and an elevated configuration, such that the lifting rollers when in the elevated configuration are at a higher elevation than the transport rollers of the first conveyor line. The method includes the steps of:
  (a) conveying a sheet along the first conveyor line in the first direction,
  (b) operating the shuttle system to transfer the sheet from the first conveyor line to the second conveyor line by:
    (i) moving the lifting rollers from the retracted configuration to the elevated configuration and thereby lifting the glass sheet off the transport rollers of the first conveyor line, (ii) moving the lifting rollers from a first location to a second location, thereby moving the sheet from a position above the first conveyor line to a position above the second conveyor line, and (iii) moving the lifting rollers from the elevated configuration to the retracted configuration and thereby setting the sheet onto the conveyor belts of the second conveyor line, and (c) conveying the sheet along the second conveyor line in the second direction.

The details of one or more examples are set forth in the accompanying drawings and the description below. Other features, objects, and advantages will be apparent to skilled artisans given the present descriptions, drawings, and claims.

DETAILED DESCRIPTION

Figure 1:
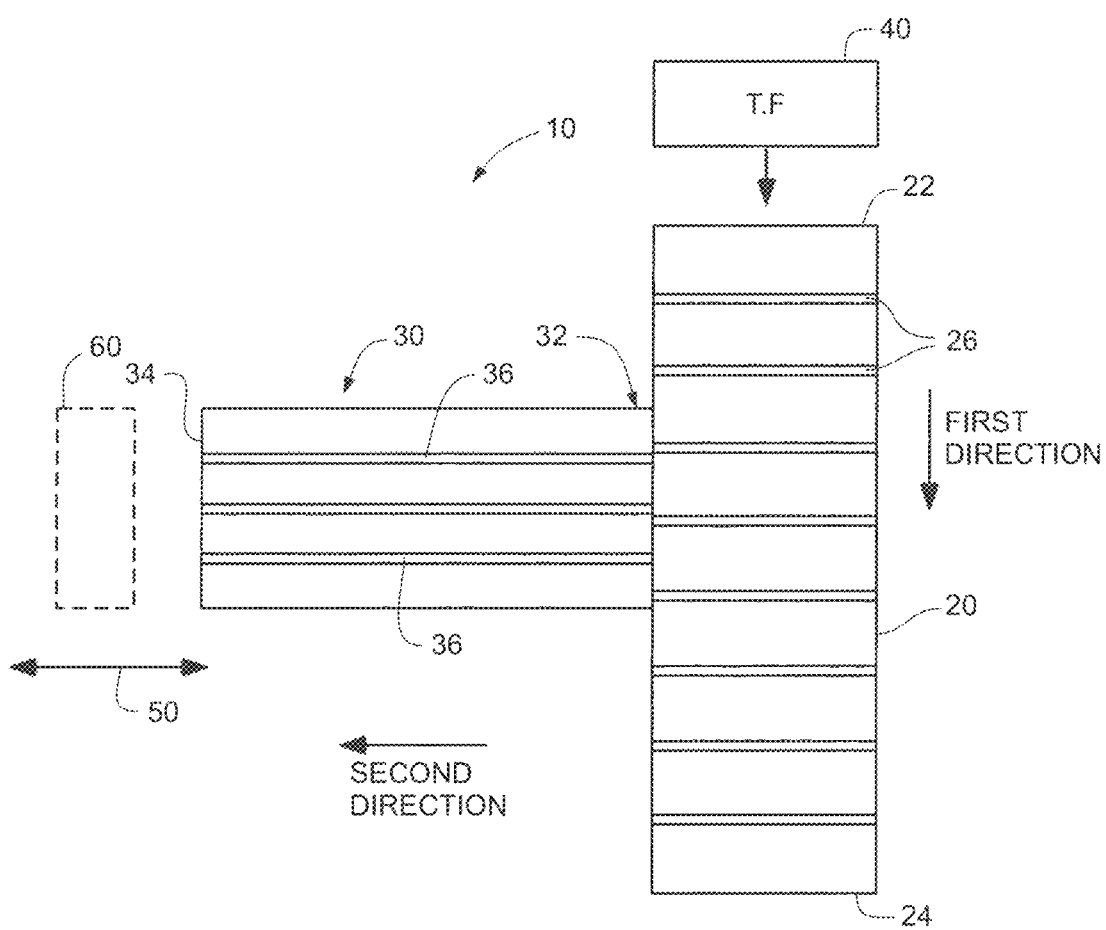
FIG. 1 is a schematic top view of a conveyor system in a tempering line in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention.

Skilled artisans will recognize that the examples provided herein have many useful alternatives that fall within the scope of the invention.

FIG. 1 is a schematic top view of a conveyor system 10 in a tempering line in accordance with certain embodiments of the present invention. The system 10 has a first conveyor line 20 and a second conveyor line 30. The second conveyor line 30 is preferably located crosswise to the first conveyor line 20. The preferred embodiments of the invention are described with reference to a glass processing line, namely a glass tempering line, but the embodiments of the invention are not limited thereto. The embodiments of the invention may be used in other glass processing systems (e.g., other than tempering lines) as well as non-glass processing systems in which a sheet of material is to be transferred between at least one conveyor line and another conveyor line. In a preferred embodiment, the first conveyor line 20 is located downstream from a glass tempering furnace 40, although it may alternatively be located downstream from other types of glass processing equipment. The first conveyor line 20 extends (and is configured to convey sheets) in a first direction, e.g., from a first end 22 to a second end 24. The second conveyor line 30 is located adjacent to the first conveyor line 20 downstream from the first end 22 of the first conveyor line 20. The second conveyor line 30 extends (and is configured to convey glass sheets) in a second direction, e.g., from a first end 32 adjacent to the first conveyor line 20 to a second end 34, which can optionally be adjacent to an unloading zone 50. In such embodiments, there can optionally be a vertical sheet accumulator 60, on (or downstream from) the second conveyor line 30. Alternatively, the second conveyor line 30 may terminate at the unloading zone, where glass sheets conveyed along the second conveyor line are removed and stacked on one or more racks. In embodiments of this nature, the glass sheets may be removed and stacked manually. More preferably, though, the glass sheets are removed and stacked using an automated glass stacking system. One suitable example is disclosed in U.S. Pat. No. 11,111,086, the contents of which are incorporated herein by reference.

In operation, the first conveyor line 20 transports a sheet in a first direction. While the sheet is being transported in the first direction, it may be transferred to the second conveyor line 30 by a shuttle system, as will be discussed in greater detail hereinafter. Once a sheet has been transferred to the second conveyor line 30, the second conveyor line 30 transports that sheet in a second direction, which is preferably crosswise to the first direction.

In a preferred embodiment, a sheet, preferably a glass sheet that has been tempered in the noted tempering furnace, is transported along the first conveyor line 20 and then transferred to the second conveyor line 30. In a preferred embodiment, the second conveyor line 30 transports the sheet to an unloading zone 50, which can optionally include (or be preceded with) a vertical sheet accumulator 60. In other embodiments, the second conveyor line 30 transports the sheet to another station or stations, or to another conveyor line, rather than conveying the sheet to an unloading zone.

The first and second conveyor lines 20 and 30 preferably are configured to convey sheets in a horizontal (or at least generally horizontal) orientation. This orientation may be characterized by each so-positioned sheet having opposed first and second major surfaces (or "faces") respectively facing upwardly and downwardly (e.g., such that the sheet lies in a horizontal plane). Reference is made to FIGS. 14-19, for example. If desired, there may be one or more areas where the path of travel has some incline or decline. In cases where the upwardly major surface of the sheet must not be touched, it can be conveyed by the embodiments of the present invention that preserves that feature.

The sheets preferably are monolithic sheets of glass. It is to be appreciated, however, that the system 10 can alternatively be used with sheets of other materials. In alternative embodiments, the sheets are formed of polymer, such as polycarbonate, acrylic, or PVC. When the sheets are formed of glass, they preferably are soda-lime glass. In other cases, borosilicate glass or aluminosilicate glass may be used. In the preferred embodiment, the glass sheets are tempered glass sheets. In some cases, the sheets being conveyed are laminated glass panels, IG units, or a subassembly for a laminated glass panel or IG unit.

In some cases, the first conveyor line 20 is a portion of a tempering production line (e.g., first conveyor line may be configured to convey tempered glass sheets away from a cold end of a tempering furnace). It is to be appreciated, however, that the system 10 can also be used for various other applications. As just one example, the system 10 can be used to transfer glass sheets that are conveyed along a conveyor line extending away from a coating station where the glass is coated (e.g., with one or more thin films), such as a sputter coating line.

The illustrated first conveyor line 20 defines a path of substrate travel, which preferably extends in a horizontal (or at least generally horizontal) direction. The first conveyor line 20 includes a plurality of transport rollers 26. The transport rollers 26 preferably are each at least generally cylindrical in shape and can be controlled to rotate either individually, controlled to rotate as a group or groups, or controlled to rotate in unison. When controlled, either individually, as a group or groups, or in unison, they can be made to rotate at a prescribed speed or they may be rendered stationary. It is not required that each transport roller 26 be driven. When the transport rollers 26 rotate, a sheet placed thereon is moved in a first direction so that it is transported from one transport roller 26 to an adjacent transport roller 26 and so on. When the transport rollers 26 are stationary, the sheet placed thereon is not transported but remains stationary on the non-rotating transport rollers 26. Transport roller systems used in glass sheet conveyor lines are well known to those of ordinary skill in the art.

The second conveyor line 30 includes a plurality of conveyor belts 36. As can be seen from FIG. 2, the illustrated conveyor belts 36 of the second conveyor line 30 are at a higher elevation than the transport rollers 26 of the first conveyor line 20. This, however, is not required. Instead, the conveyor belts 36 of the second conveyor line 30 can be at the same elevation as, or lower than, the transport rollers 26 of the first conveyor line 20. The illustrated conveyor belts 36 are arranged in a parallel fashion to one another. The second conveyor line 30 has a first end 32 located adjacent to the first conveyor line 20, preferably at some point located between the first conveyor line's first and second ends. 22 and 24. The second conveyor line 30 has a second end 34 located distal from the first conveyor line 20, opposite of the second conveyor line's first end 32. Each conveyor belt 36 preferably has a texturized surface on its exterior which will come into contact with a sheet when it is placed on the second conveyor line 30. The optional texturized surface assists in holding the sheet in place at the position on the conveyor belt 36 where it was placed. As the conveyor belts 36 rotate, they transport the sheet in the second direction, i.e., from a first location of the second conveyor line near the first conveyor line 20 to a second location of the second conveyor line 30 distal from the first conveyor line 20 and preferably adjacent to an unloading zone 50. Conveyor belt systems for moving glass sheets are well known to those of ordinary skill in the art.

In the embodiments illustrated, the transport rollers 36 of the first conveyor line 20 are spaced apart from one another, and similarly, the conveyor belts 36 of the second conveyor line 30 are spaced apart from one another. By this arrangement there is a space or gap region between each two adjacent transport rollers 26 and between each two adjacent conveyor belts 36. As will be discussed in greater detail hereinafter, it is in these spaces or gap regions that a shuttle system according to certain embodiments of the present invention operates to transport a sheet or multiple sheets from the first conveyor line 20 to the second conveyor line 30.

Figure 30:
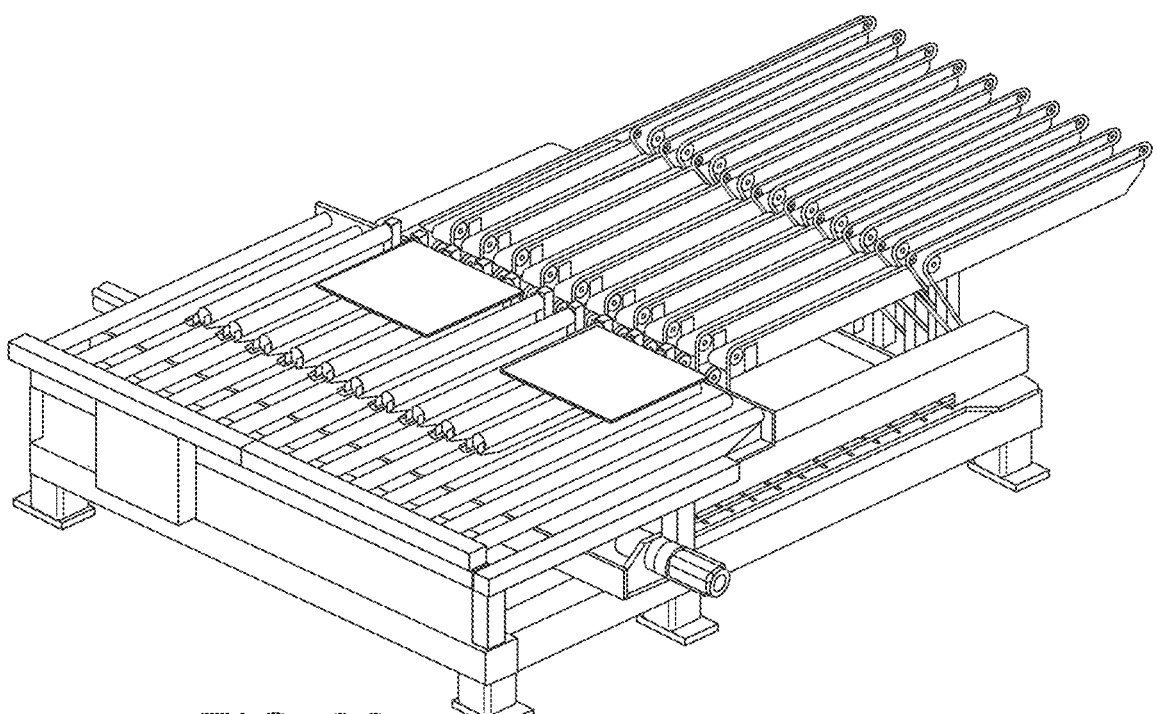
FIG. 30 is a perspective view of the system shown in FIG. 29, showing the two sheets lifted by the shuttle system in accordance with certain embodiments of the present invention.

FIGS. 2-5 illustrate in greater detail a portion of the system which includes the first conveyor line 20, the second conveyor line 30 and the shuttle system 70. The transport rollers 26 of the first conveyor line 20 preferably are arranged in a frame 28 so that each of the plurality of transport rollers 26 extends from a first end 27 of the frame 28 to an opposite end 29 of the frame 28. Each transport roller 26 preferably is operated to rotate so that a sheet placed on the first conveyor line 20 will move in a first direction when the transport rollers 26 are operated. Each of a series of the transport rollers 26 is received rotatably by first and second rotary bearings located respectively on first and second end supports, which are located on the frame 28 at the first end 27 and opposite end 29, respectively. Thus, there preferably is a series of second end supports with a gap region located between each adjacent two of the second end supports. Further, each of the lifting rollers 72 (to be described in detail hereinafter) preferably is disposed in a respective one of the gap regions. The conveyor belts 36 of the second conveyor line 30 extend in a direction that is crosswise to the first conveyor line 20. The conveyor belts 36 of the second conveyor line 30 transport a sheet placed thereon in a second direction, away from the first conveyor line 20, e.g., from the first end 32 of the second conveyor line 30 toward the second end 34 of the second conveyor line 30. Located at the second end 34 of the second conveyor line 30 preferably is an unloading zone 50, which will be described in greater detail hereinafter. The conveyor belts 36 of the second conveyor line 30 may be flexible belts that each extend in a metal tray (135, see FIG. 30) and/or along a beam (130, see FIG. 30) that supports the conveyor belt 36. The conveyor belts 36 collectively provide a surface region of the second conveyor line 30 that supports a sheet or sheets. The conveyor belts 36 are preferably run together at a predetermined speed. In some embodiments, the second conveyor line 30 comprises two groups of conveyor belts 36 to create two zones that can be operated at two different speeds. FIG. 30 shows one embodiment. If no object is placed on the second conveyor line 30, the conveyor belts 36 may be stationary.

Included in the transport system shown in FIGS. 2-5 is a shuttle system 70. The shuttle system 70 operates to transport a sheet or multiple sheets from the first conveyor line 20 to the second conveyor line 30 in a smooth, efficient manner that does not require manual intervention. The shuttle system 70 also allows the first conveyor line 20 to continue operation without slowing down or stopping, thereby increasing throughput of the system.

Figure 2:
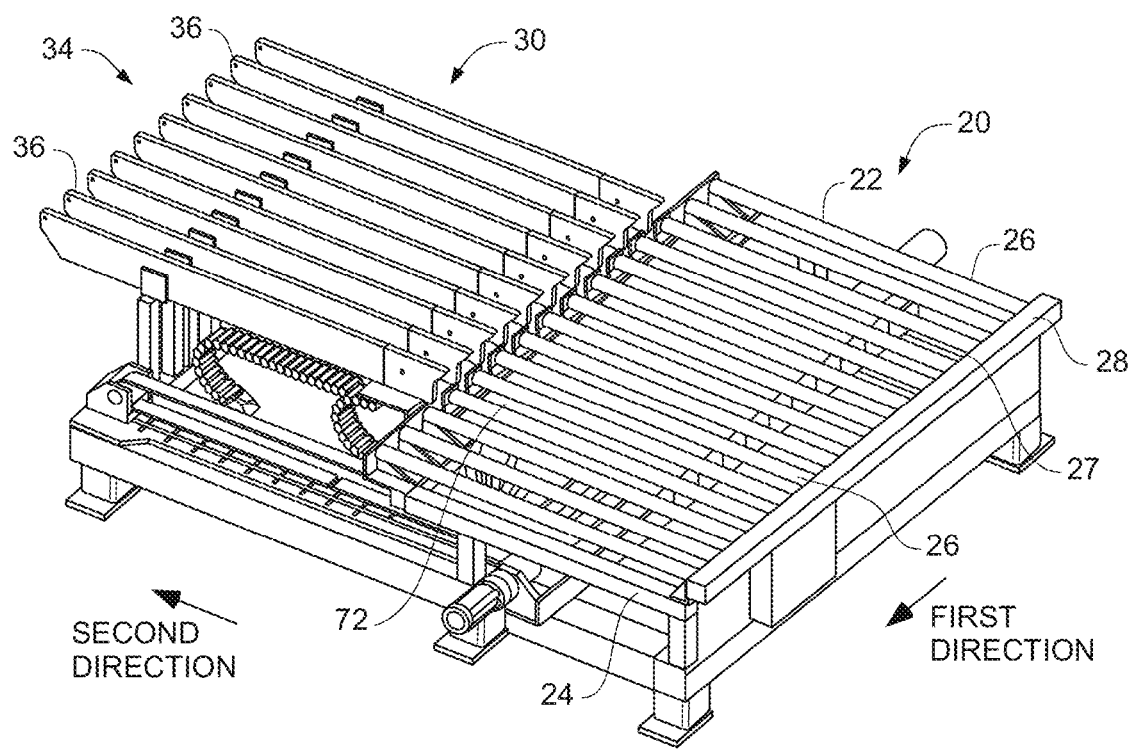
FIG. 2 is a perspective view of a portion of the system shown in FIG. 1, showing a first conveyor line and second conveyor line positioned crosswise to the first conveyor line in accordance with certain embodiments of the invention.
Figure 3:
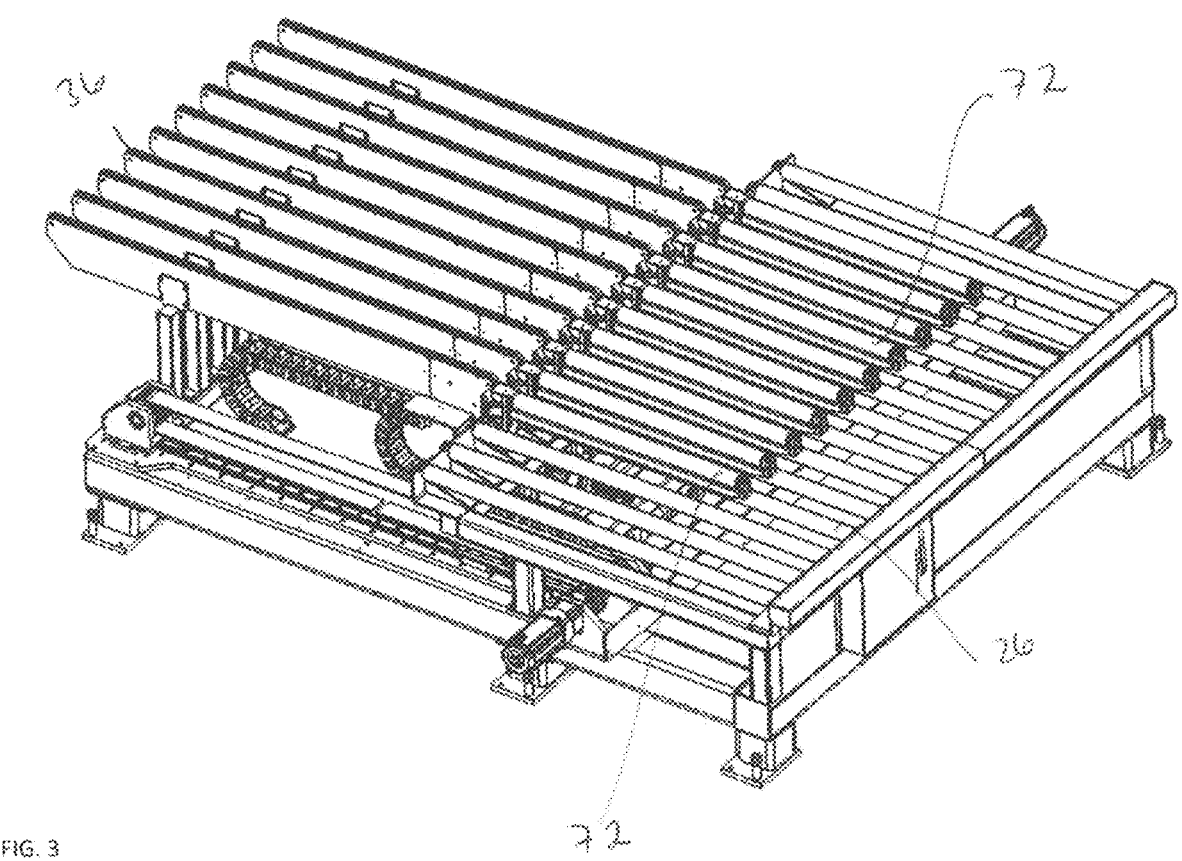
FIG. 3 is another perspective view of the system of FIG. 2, showing a shuttle system in a second position in accordance with certain embodiments of the invention.
Figure 4:
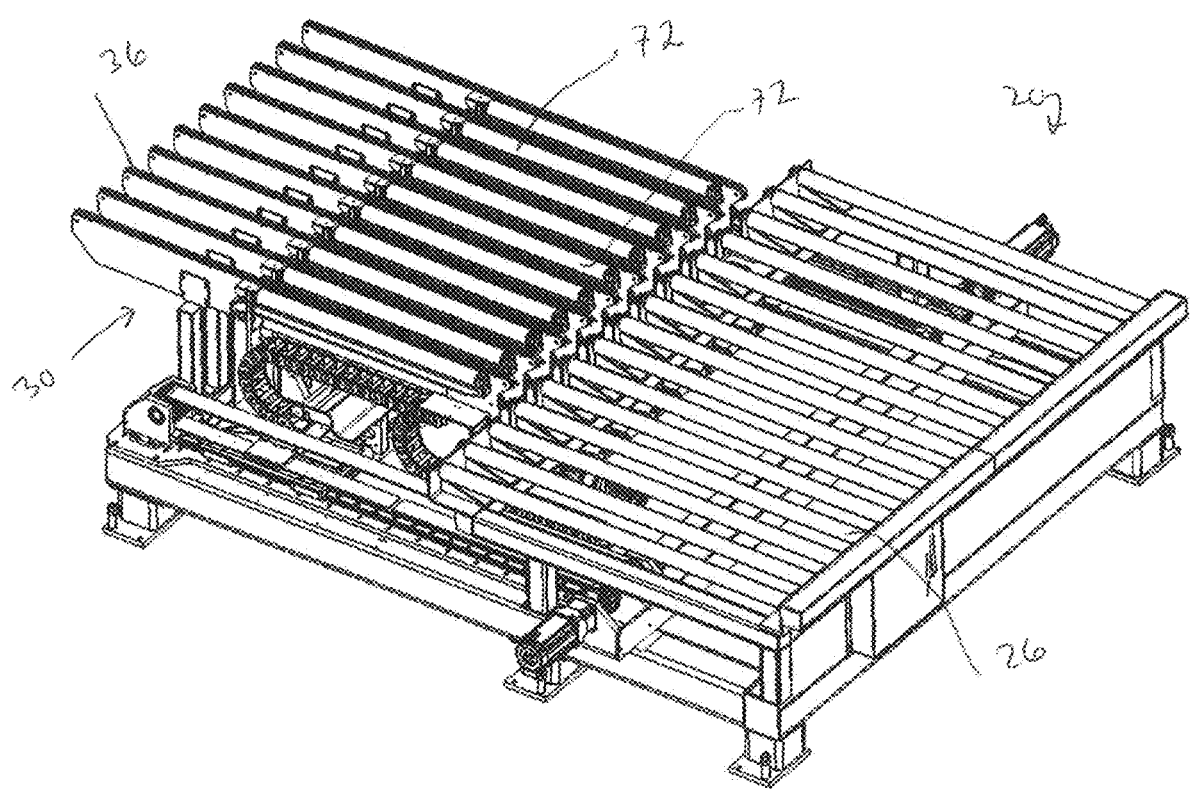
FIG. 4 is another perspective view of the system of FIG. 2, showing the shuttle system in a third position in accordance with certain embodiments of the invention.
Figure 5:
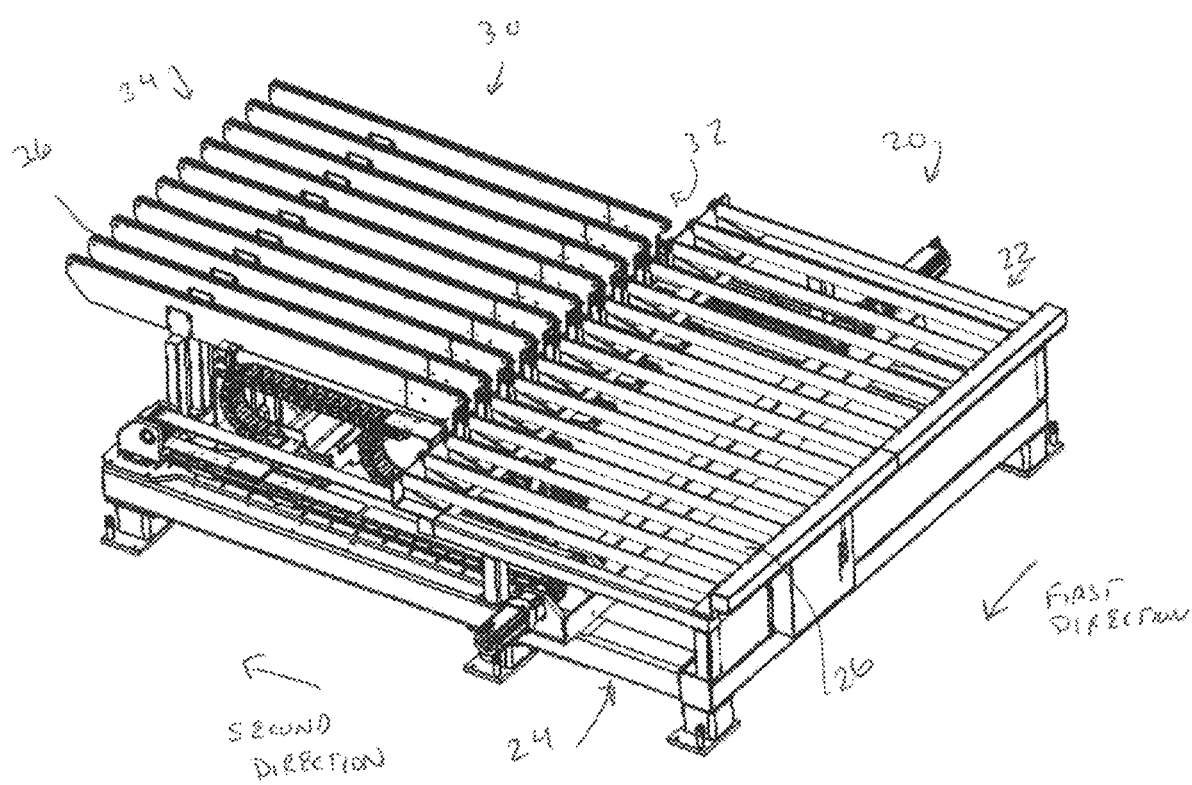
FIG. 5 is another perspective view of the system of FIG. 2, showing the shuttle system in a fourth position in accordance with certain embodiments of the invention.

The shuttle system 70 preferably has four main states (or positions) that dictate the location of a sheet or sheets with respect to the first and second conveyor lines, 20 and 30, respectively. In FIGS. 2-5, these states (or positions) will be shown without the presence of a sheet or sheets to simplify the description. In FIG. 2, the shuttle system 70 is shown in its first state. In this first state, lifting rollers 72 of the shuttle system 70 are in a retracted position. In this retracted configuration, the top surface areas of the retracted lifting rollers 72 are either lower than, or substantially level with, the top surface areas of adjacent transport rollers 26 of the first conveyor line 20. FIG. 3 shows the shuttle system 70 in its second state. In the second state, lifting rollers 72, which will be described in detail hereinafter, are in an extended configuration. In this extended configuration, the lifting rollers 72 are located above the transport rollers 26 of the first conveyor line 20 and above the conveyor belts 36 of the second conveyor line 30. In such state, the top surface areas of the extended lifting rollers 72 are higher than: (i) the top surface areas of the adjacent transport rollers 26 of the first conveyor line 20, and (ii) the top surface areas of conveyor belts 36 of the second conveyor line 30. When a sheet is ready to be transferred to the second conveyor line 30, the shuttle system 70 laterally translates the lifting rollers 72 from the position shown in FIG. 3 towards the second conveyor line 30 until they reach the position shown in FIG. 4. Once the shuttle system 70 has moved to its third state as shown in FIG. 4, the sheet or sheets (not shown) are ready to be set down onto the second conveyor line 30. The lifting rollers 72 can then be moved to their fourth state, which is a retracted configuration. In this retracted configuration, the top surface areas of the retracted lifting rollers 72 are lower than the top surface areas of adjacent conveyor belts 36 of the second conveyor line 30. This is shown in FIG. 5. The sheet or sheets are then able to be transported by the second conveyor line 30 in a second direction, e.g., towards an unloading area.

In the embodiments illustrated, the lifting rollers 72 are positioned so as to be received in (e.g., so as to project upwardly through) a plurality of longitudinal gap regions or spaces between adjacent transport rollers 26 of the first conveyor line 20 and adjacent conveyor belts 36 of the second conveyor line 30. In a preferred embodiment, between each two adjacent transport rollers 26 in the shuttle area and between each two adjacent conveyor belts 36 there is a gap region or space to receive a lifting roller 72 as discussed above.

These longitudinal gap regions or spaces are perhaps best shown in FIG. 2. With respect to the transport rollers 26 of the first conveyor line 20, the noted gap regions or spaces extend in a lateral direction, e.g., perpendicular to the path of substrate travel along the first conveyor line 20, i.e., perpendicular to the first direction. With respect to the conveyor belts 36 of the second conveyor line 30, the noted gap regions or spaces extend in a longitudinal direction, e.g., parallel to the path of substrate travel along the second conveyor line 30, i.e., parallel to the second direction.

Figure 6:
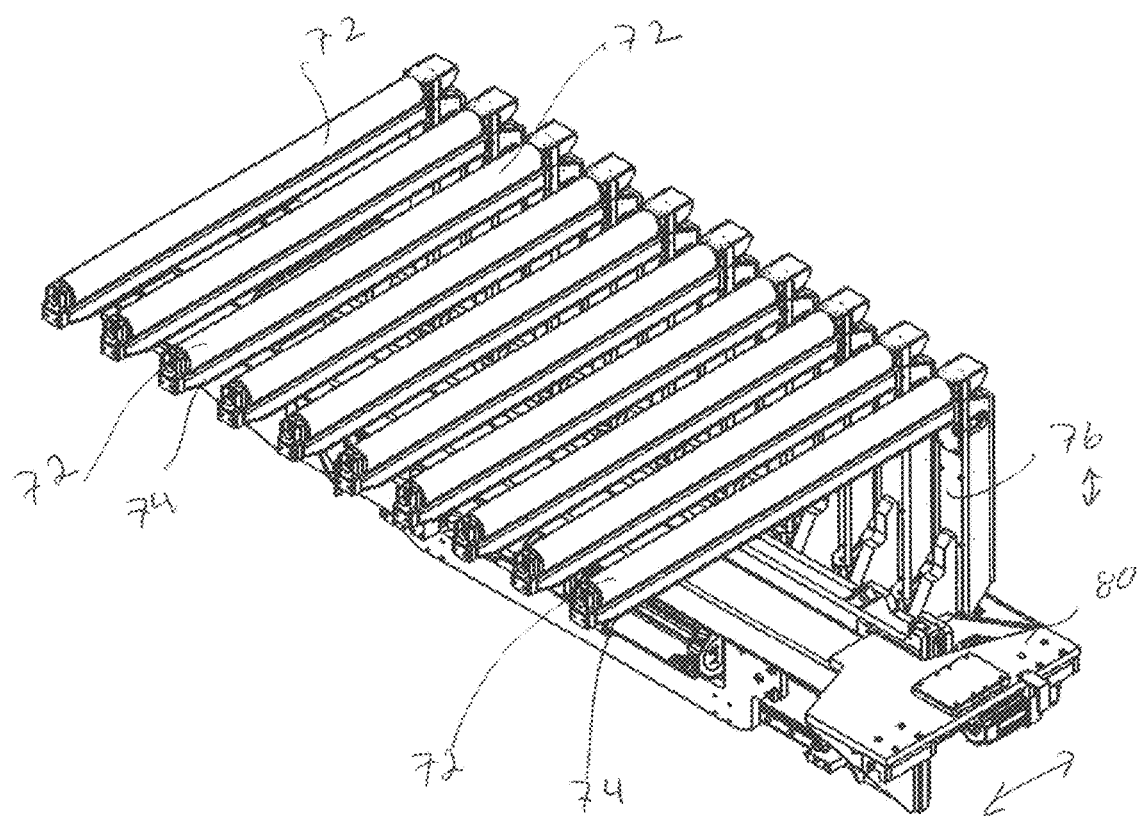
FIG. 6 is a perspective view of a portion of a shuttle system in accordance with certain embodiments of the invention.
Figure 7:
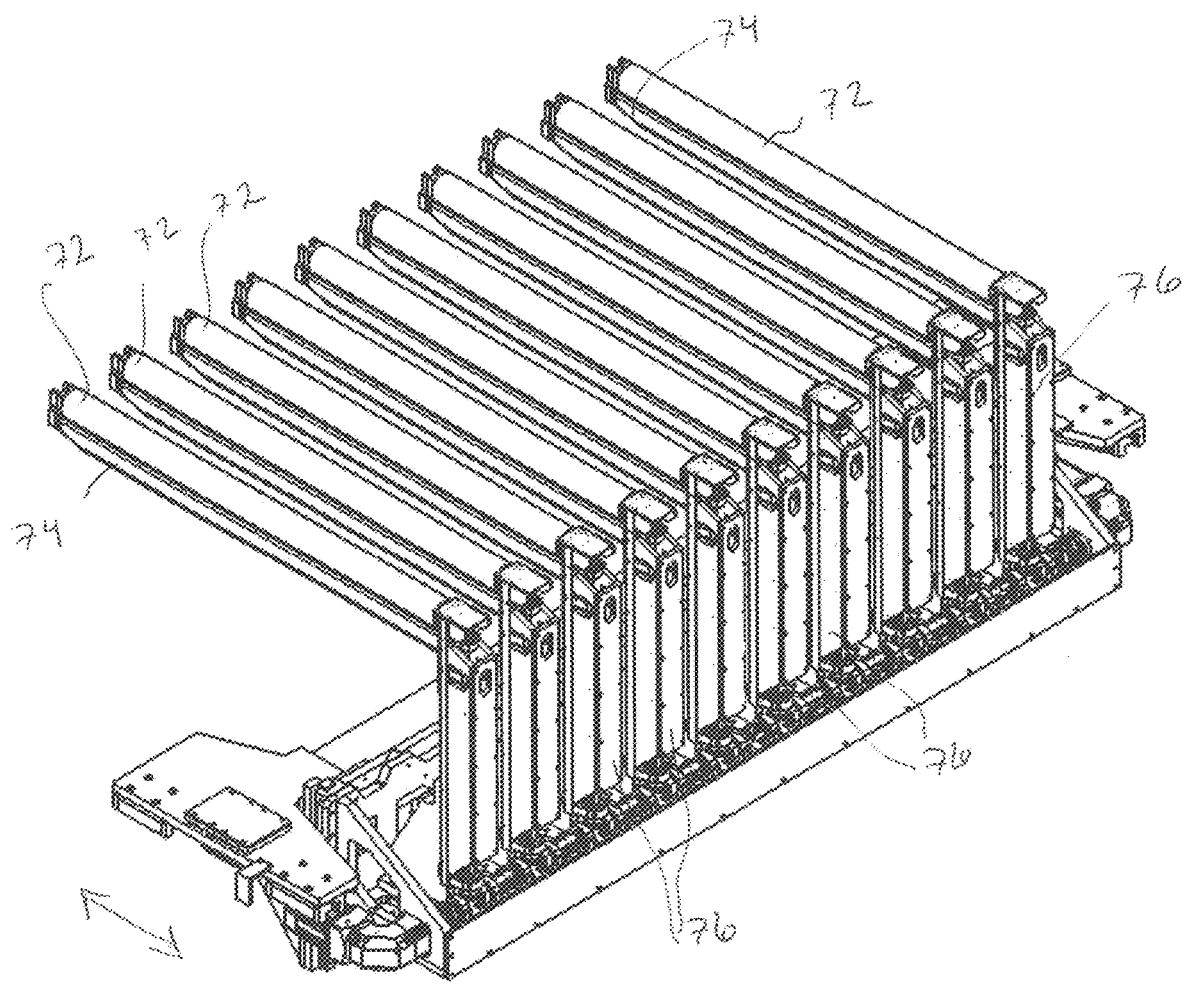
FIG. 7 is another perspective view of the shuttle system of FIG. 6.

FIGS. 10-13 illustrate various portions of the shuttle system 70 according to a preferred embodiment of the invention. In FIG. 6, the shuttle system 70 is shown in isolation, i.e., removed from the first and second conveyor lines 20 and 30, to better illustrate its parts. The shuttle system 70 includes a plurality of lifting rollers 72, which preferably are each rotatably mounted on a support beam 74 that extends in parallel with the lifting roller 72. Each illustrated lifting roller 72 and support beam 74 pair is operatively coupled to a support column 76. The support columns 76 are operatively coupled to a carriage (or "chassis") 80 that can be translated laterally from a first location to a second location. The first location is located at (e.g., beneath) the first conveyor line 20 and the second location is located at (e.g., beneath) the second conveyor line 30. These locations will be further described with respect to FIGS. 10-13. FIG. 7 is a perspective view of the shuttle system 70 viewed from a different angle. When the shuttle system 70 of FIG. 6 is assembled together with the first and second conveyor lines 20 and 30, the end of the chassis 80 where the support columns 76 are located is adjacent to the first end 32 of the second conveyor line 30 when the shuttle system 70 is in its first and second states and it is located distal from the first end 32 of the second conveyor line 30 when the shuttle system 70 is in its third and fourth states.

Figure 8:
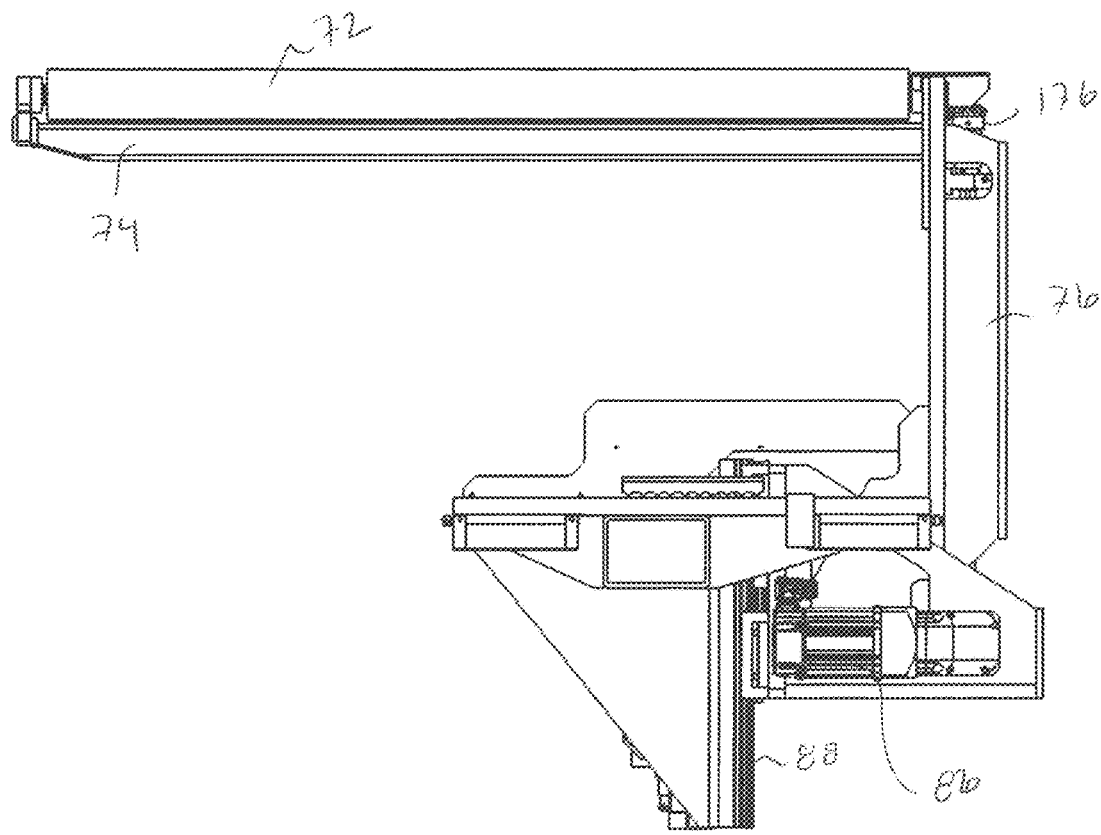
FIG. 8 is side view of a portion of the shuttle system of FIG. 6 showing one lifting arm in accordance with certain embodiments of the present invention.
Figure 9:
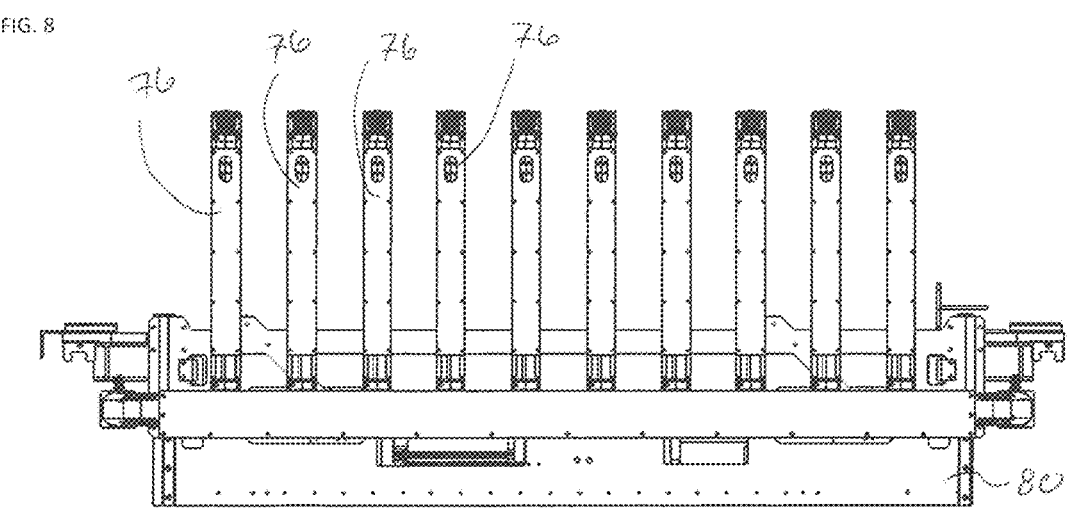
FIG. 9 is back view of the shuttle system of FIG. 6.
Figure 10:
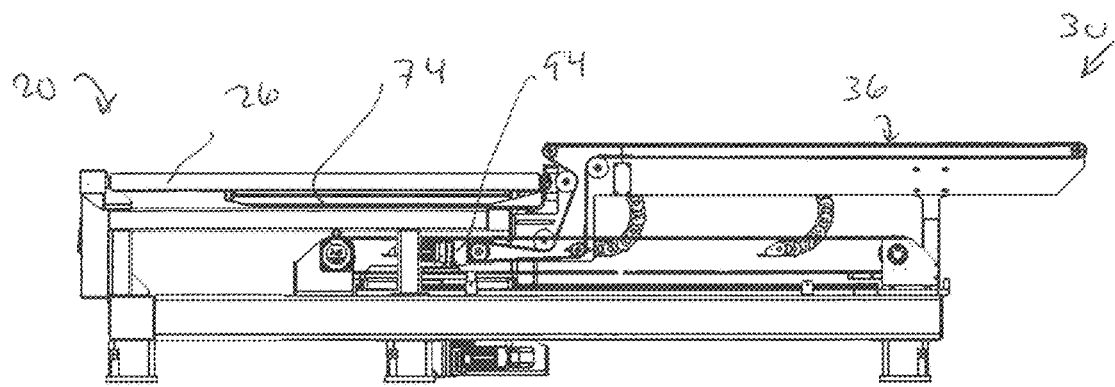
FIGS. 10-13 are side views of the conveyor system of FIGS. 2-5 with the shuttle system thereof shown in first, second, third and fourth states or positions, respectively, in accordance with certain embodiments.
Figure 21:
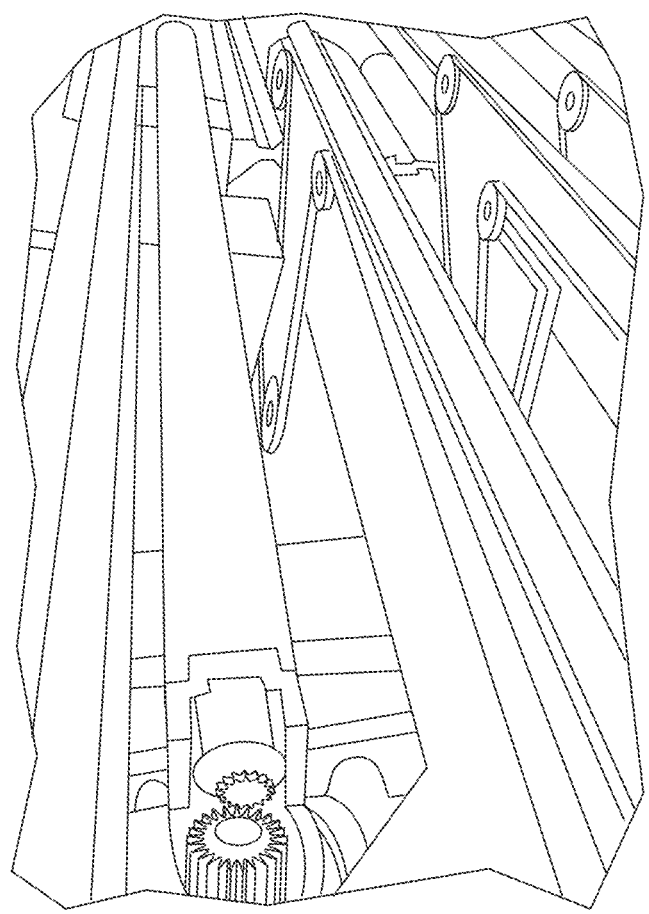
FIG. 21 is a perspective view of a rotary gear of a drive mechanism located in a support column, with the rotary gear of the drive mechanism intermeshed with a gear of a lifting roller.

FIG. 8 illustrates one lifting roller 72 to show the details thereof. The support column 76 can be translated in a vertical up and down direction by a motor 86. The motor 86 is configured to move the support column 76 (and hence the lifting roller) between a retracted configuration and an extended configuration. The motor 86 can be part of a subassembly that moves vertically along a guide 88 of the chassis 80. The motor 86 is operatively coupled to a controller (not shown) that controls movement of the lifting roller 72. In the embodiment illustrated, the support column 76, support beam 74 and lifting roller 72 are parts of a cantilevered assembly having a second end located at the support column and a first end located distal thereto, which is unsupported (i.e., the illustrated first end is a free end, or "tip", of the cantilevered assembly). Extending through each of the illustrated support columns 76 is a drive shaft 176 that is configured to drive rotation of a respective lifting roller 72. Preferably, intermeshed rotary gears are used, as seen in FIG. 21. That is, a rotary gear of the drive shaft preferably is intermeshed with a rotary gear of the lifting roller. Thus, in certain preferred embodiments, one or more (optionally all) of the lifting rollers 72 are driven rollers. This can advantageously allow the shuttle system to place a sheet at different positions along the width of the second conveyor line 30. The first end 91 of the illustrated cantilevered assembly faces away from the second conveyor line 30 when the shuttle system 70 is in its first and second states.

Figure 11:
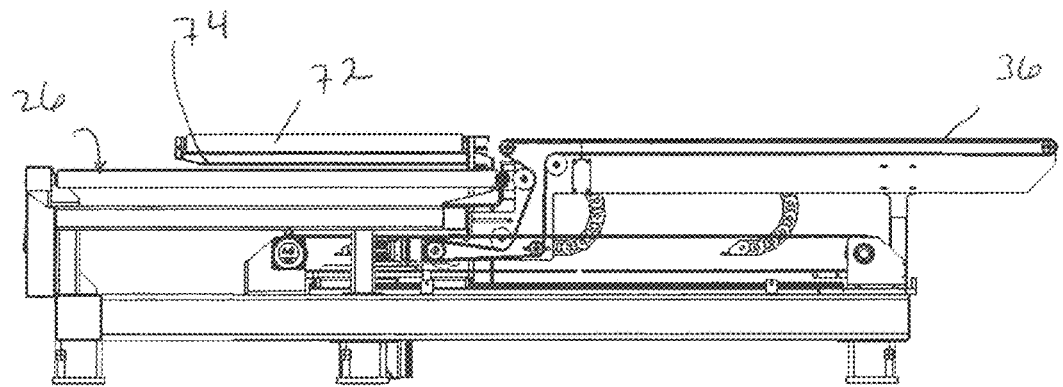
Figure 12:
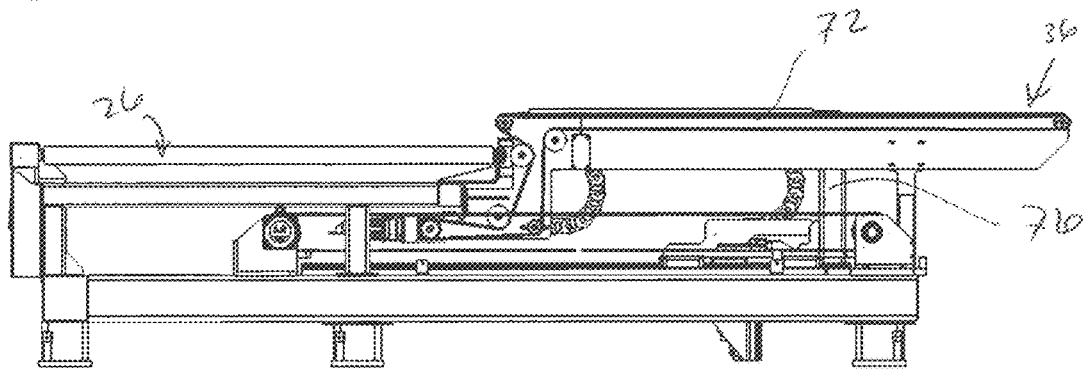
Figure 13:
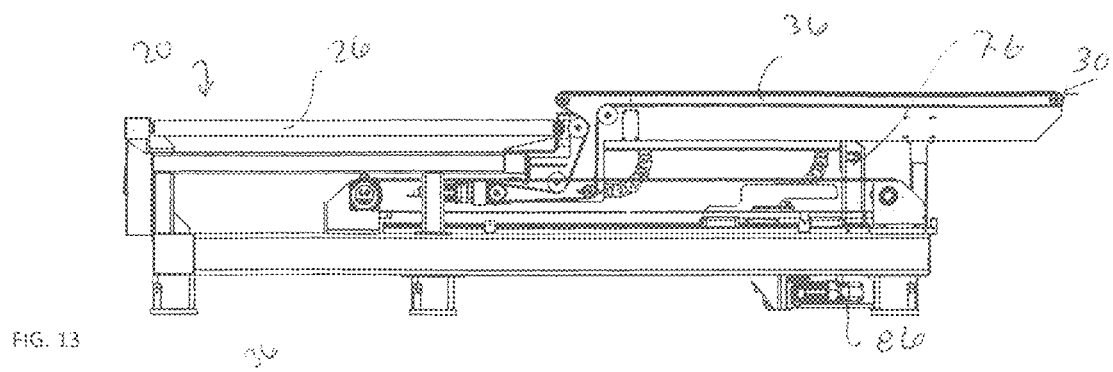

FIGS. 10-13 are side views of the shuttle system 70 in its first to fourth states (or positions), as discussed above. In particular, in FIG. 10 the shuttle system 70 is shown in its first state, which is retracted so as to be lower than, or substantially level with, transport rollers 26 of the first conveyor line 20. In this position, one can see the location of motor 86 in this first state. In FIG. 11, the shuttle system 70 is in its second state, i.e., extended so the lifting rollers 72 are elevated above the transport rollers 26 of the first conveyor line 20 while also being at a higher elevation than the conveyor belts 36 of the second conveyor line 30. In FIG. 12, it can be appreciated that the motor 86 has been moved upwardly (and is somewhat out of view). In FIG. 12, the carriage 80 of the shuttle system 70 has been translated to its second location, as can be seen by the support column 76 shown in FIG. 12. Here, the shuttle system 70 is in its third state. Note that the lifting rollers 72 remain extended in both the second state and the third state. In FIG. 13, the shuttle system 70 is shown in its fourth state where the lifting rollers 72 are retracted below the conveyor belts 36 of the second conveyor line 30. The cycle (or sequence) of states shown in FIGS. 10-13 is repeated as each new sheet (or sheets) is delivered from the first conveyor line 20 to the second conveyor line 30.

Figure 14:
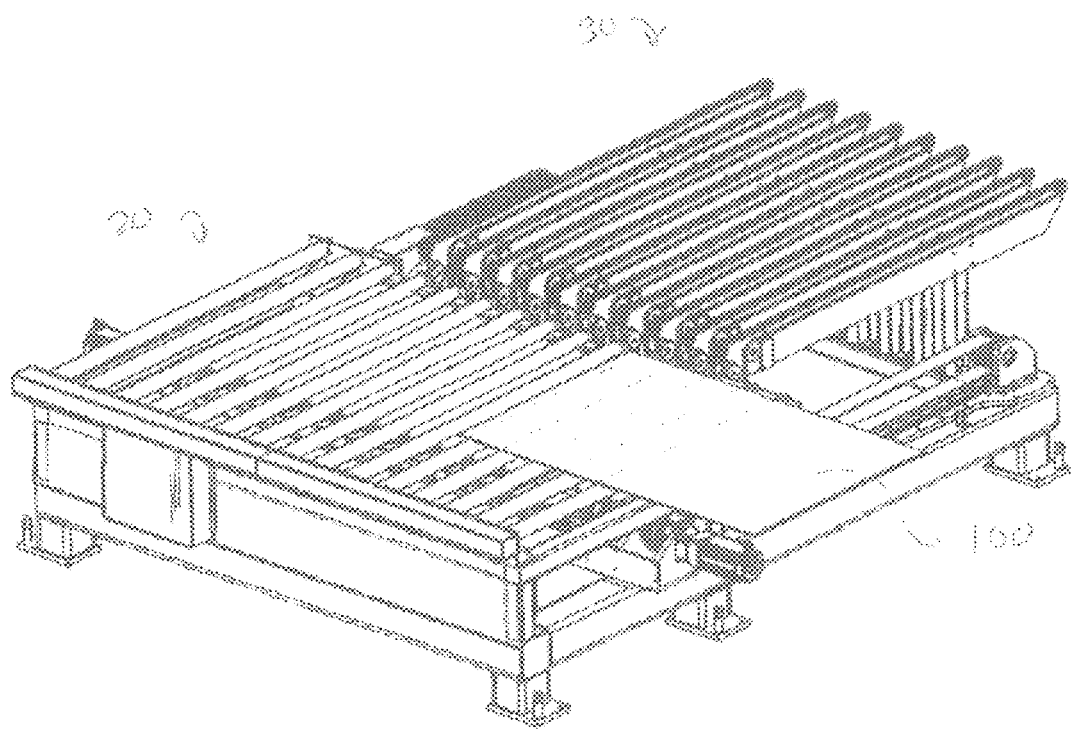
FIG. 14 is another perspective view of the system of FIG. 2, showing a sheet being transported in a first direction by the first conveyor line in accordance with certain embodiments of the present invention.
Figure 15:
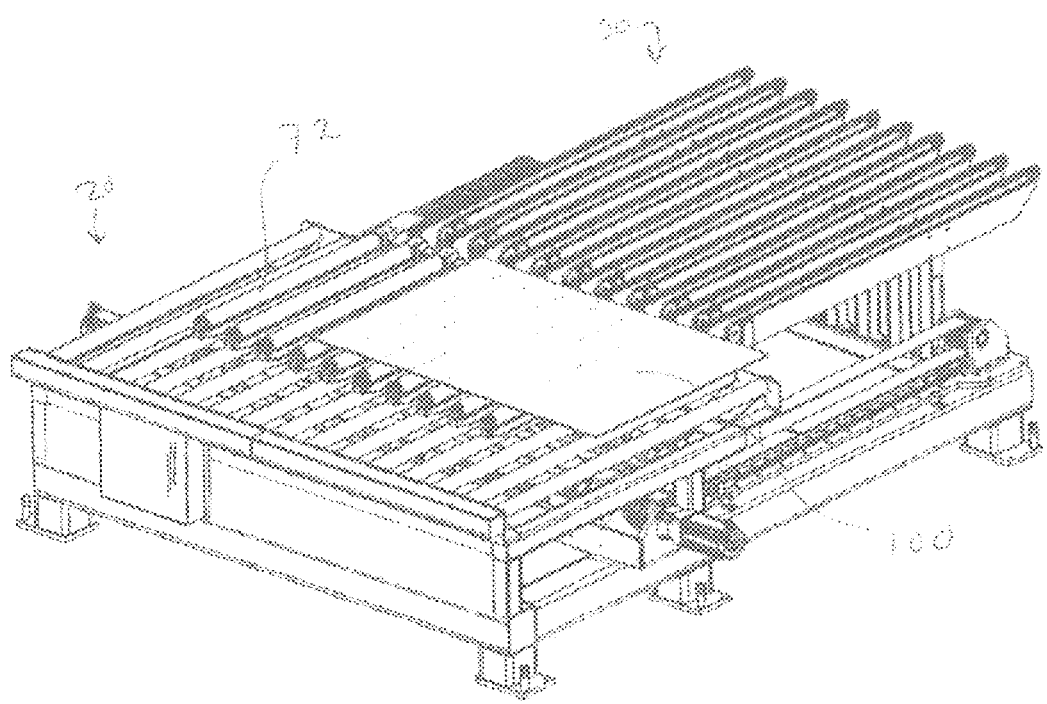
FIG. 15 is a perspective view of the system of FIG. 14, showing the sheet further along the first conveyor line and being lifted by the shuttle system in accordance with certain embodiments of the present invention.
Figure 16:
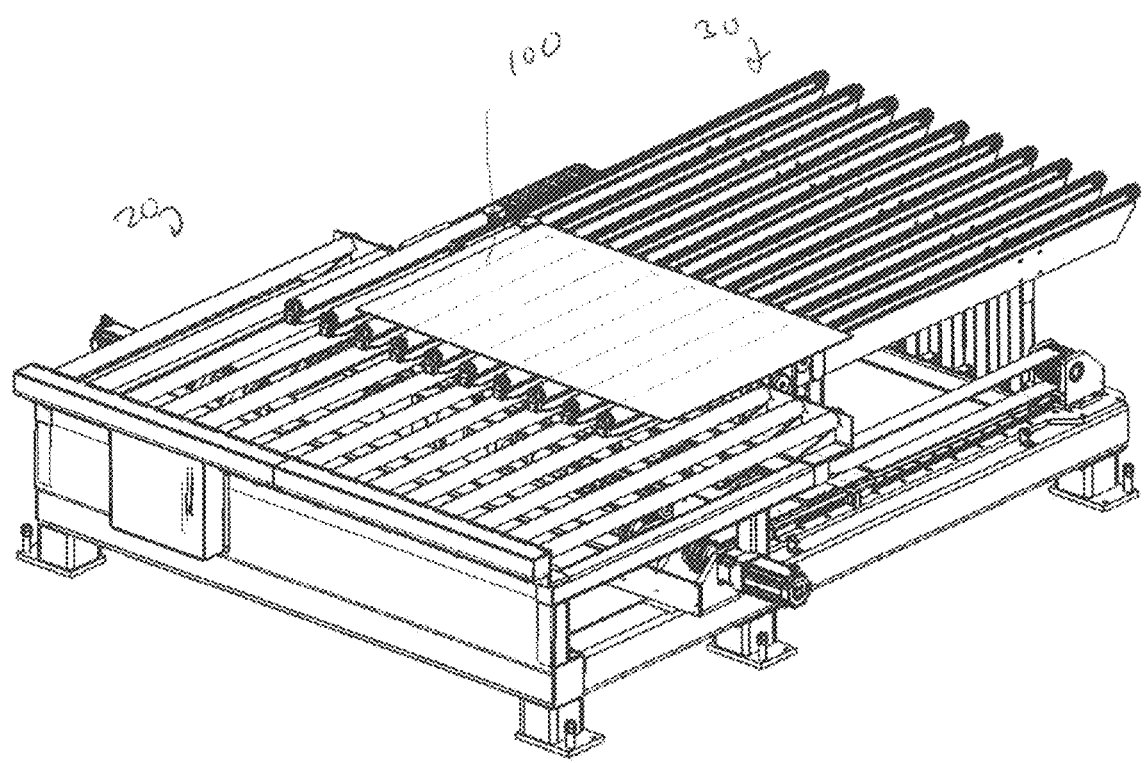
FIG. 16 is a perspective view of the system of FIG. 15, showing the sheet lifted by the shuttle system when the shuttle system is located between its second and third positions in accordance with certain embodiments of the present invention.
Figure 17:
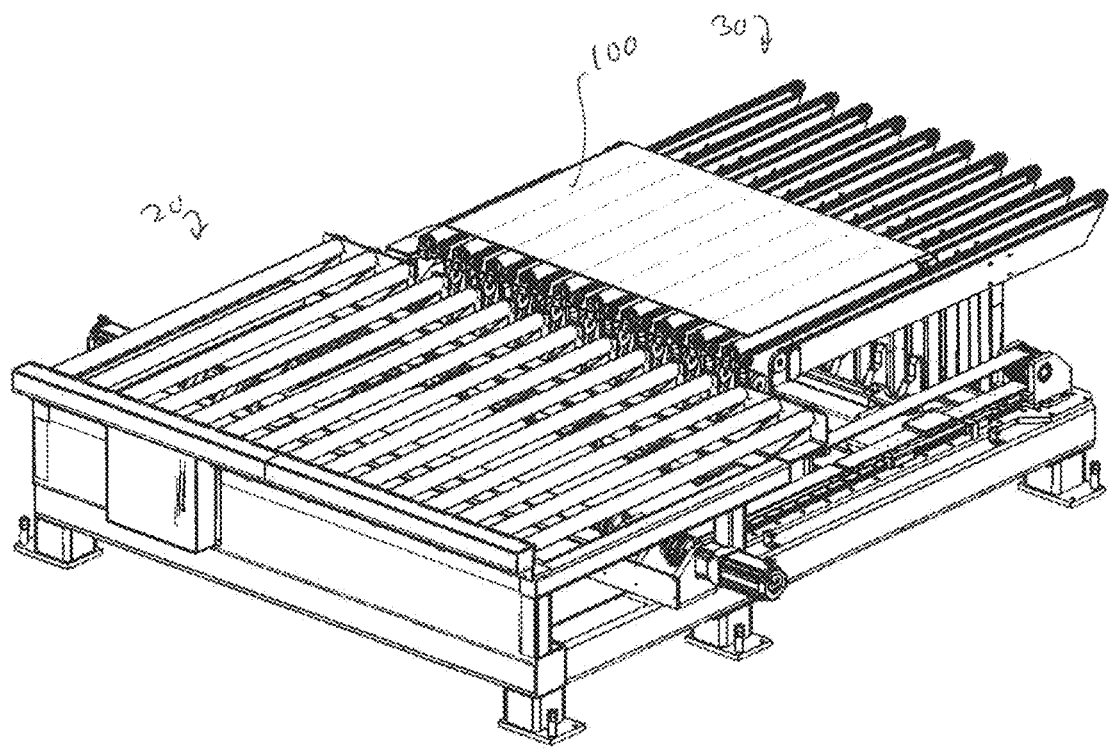
FIG. 17 is a perspective view of the system FIG. 16, showing the sheet lifted by the shuttle system when the shuttle system is in its third position in accordance with certain embodiments of the present invention.
Figure 18:
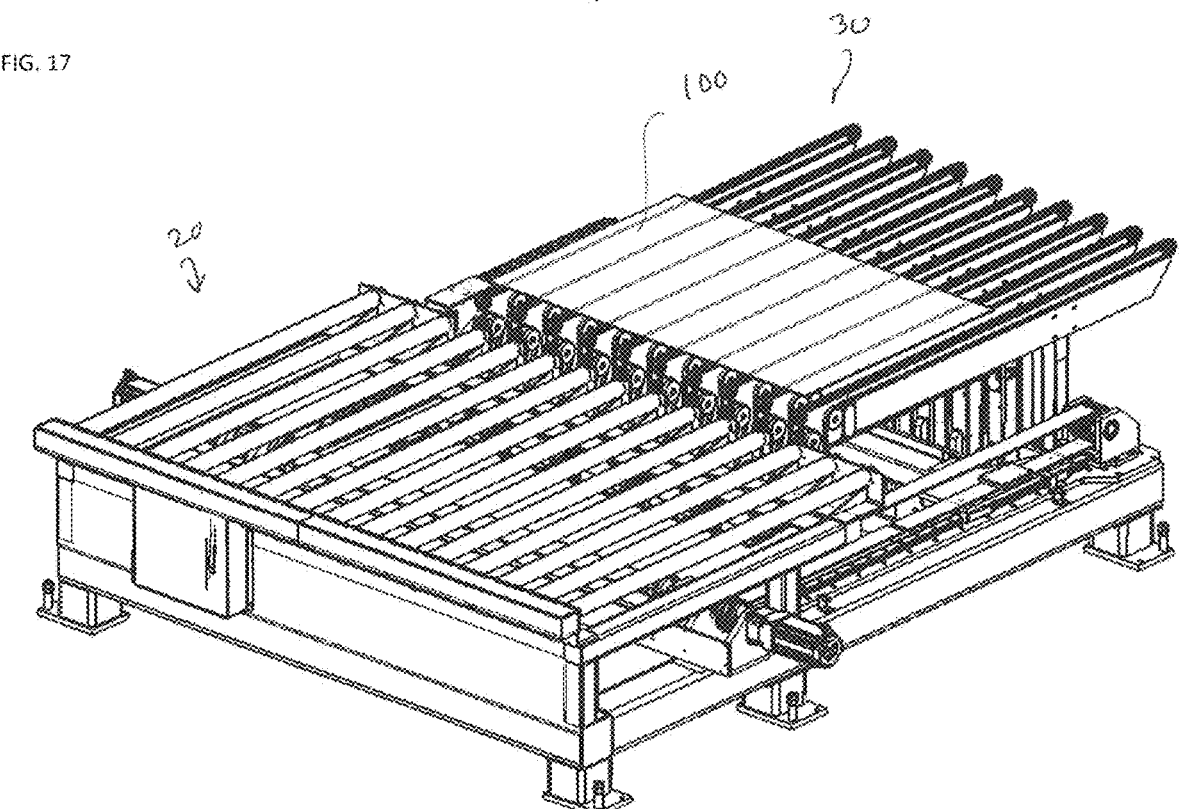
FIG. 18 is a perspective view of the system FIG. 17, showing the sheet located on the second conveyor line when the shuttle system in its fourth position in accordance with certain embodiments of the present invention.
Figure 19:
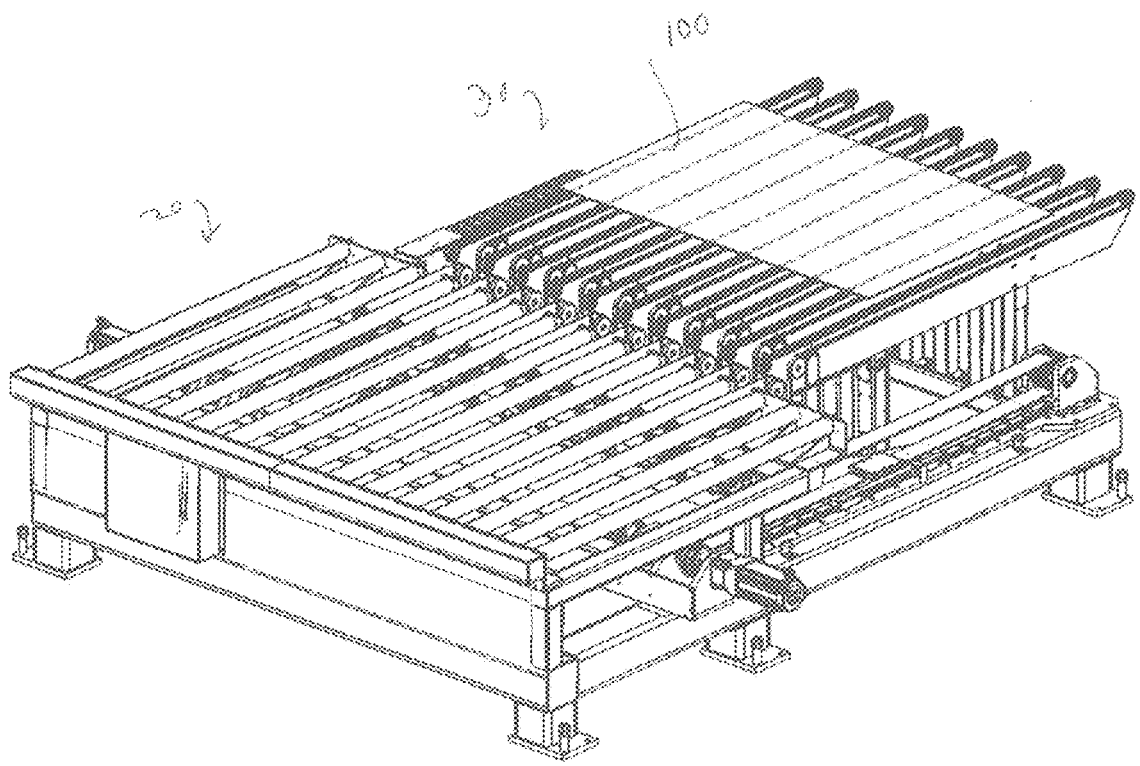
FIG. 19 is a perspective view of the system FIG. 18, showing the sheet being conveyed in a second direction by the second conveyor line in accordance with certain embodiments of the present invention.

The preferred embodiment of the invention will now be described and shown with a sheet being processed by the system. In FIG. 14, a sheet 100 is traveling on the first conveyor line 20 and the shuttle system 70 is in its first state (or position), such that the lifting rollers 72 are in a retracted configuration. Once the sheet 100 triggers a detector (not shown), the shuttle system 70 moves towards its second state, as shown in FIG. 15. Preferably, the transport rollers 26 of the first conveyor line 20 continue to rotate, while the lifting rollers 72 of the shuttle system 70 also rotate, so that the sheet 100 continues to travel along the lifting rollers 72 (i.e., in the first direction) as the shuttle system 70 moves to its second state. This can be seen with respect to FIG. 16, which shows the lifting rollers 72 in their extended configuration and the position of the sheet 100 is further along the lifting rollers 72. In FIG. 16, the shuttle system 70 is moving (e.g., linearly) from its first location towards its second location. As the shuttle system 70 is being translated, because the lifting rollers 72 are located above the conveyor belts 36 of the second conveyor line 30, the sheet 100 is not obstructed. FIG. 17 illustrates the shuttle system 70 in its third state where the lifting rollers 72 are located over a plurality of conveyor belts 36 of the second conveyor line 30. Next, the shuttle system 70 moves to its fourth state. In moving from the third state to the fourth state, the shuttle system 70 sets the sheet 100 onto conveyor belts 36 of the second conveyor line 30. FIG. 18 illustrates the shuttle system 70 in its fourth state, which involves the lifting rollers 72 being in a retracted configuration under the conveyor belts 36 of the second conveyor line 30 while the sheet 100 rests on the conveyor belts 36 of the second conveyor 30. Subsequently, as shown in FIG. 19, the sheet 100 travels in the second direction, e.g., towards an unloading zone 50.

Figure 20:
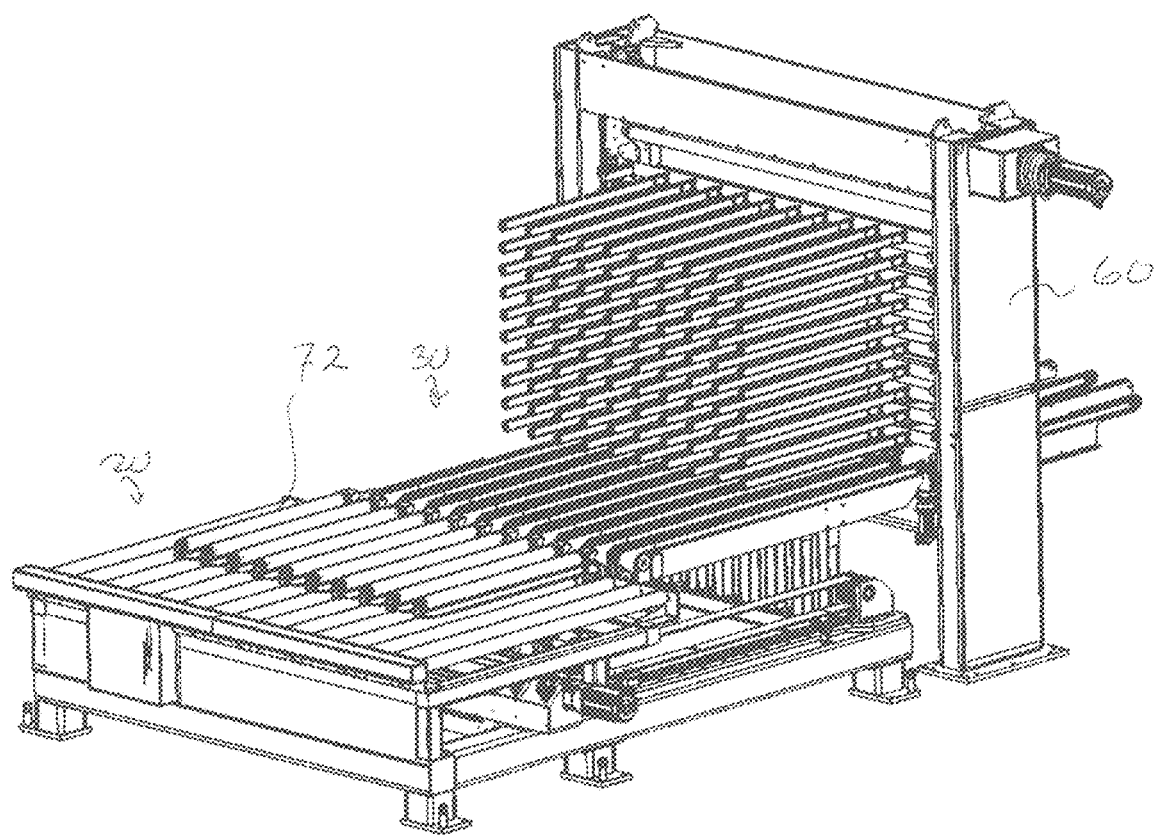
FIG. 20 is a perspective view of part of the system FIG. 1, further showing a sheet accumulator located at an unloading area adjacent to the second conveyor line in accordance with certain embodiments of the present invention.

FIG. 20 illustrates an optional sheet accumulator 60 located in an unloading zone 50 (see FIG. 1) adjacent to the second conveyor line 30. When provided, the sheet accumulator 60 preferably has a plurality of racks arranged in vertical levels which can be positioned to receive a sheet 100 as it arrives at the second end 34 of the second conveyor line 30. Once a sheet 100 has been loaded on a desired rack of the sheet accumulator 60, a rack on an adjacent level is moved in either an up or down direction to be level with the second end 34 of the second conveyor line 30 so that an additional sheet 100 can be loaded once it has been transferred to the second conveyor line 30. It is to be appreciated that the sheet accumulator is optional and thus may be omitted in some embodiments.

A controller (not shown) is in operative communication with various parts of the system so that the shuttle system can move to its proper states based on the position of the sheet or sheets. Multiple sensors (not shown) may be positioned on the first and second conveyor lines 20 and 30, respectively, to detect the position of the sheet or sheets and send detection signals to the controller, which then sends control signals to control the motors to operate as needed. For example, a sensor (not shown) may be located on the first conveyor line 20 to detect the arrival of a sheet and send a signal to the shuttle system to begin moving to its second state. The controller may control the speed at which the motors operate to properly control movement of the shuttle system both in its translation as well as the rotation of the lifting rollers, either individually, in groups or in unison.

Figure 22:
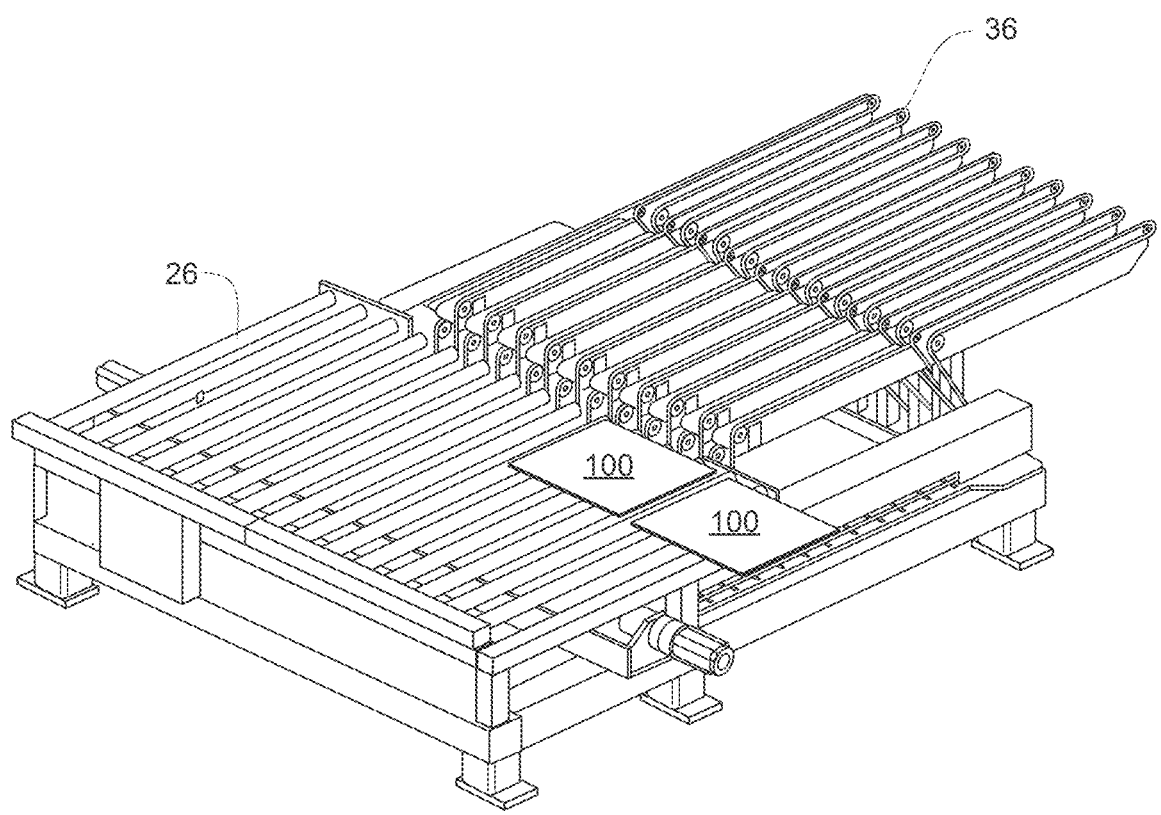
FIG. 22 is another perspective view of the system of FIG. 2, showing two sheets being transported in a first direction by the first conveyor line in accordance with certain embodiments of the present invention.
Figure 23:
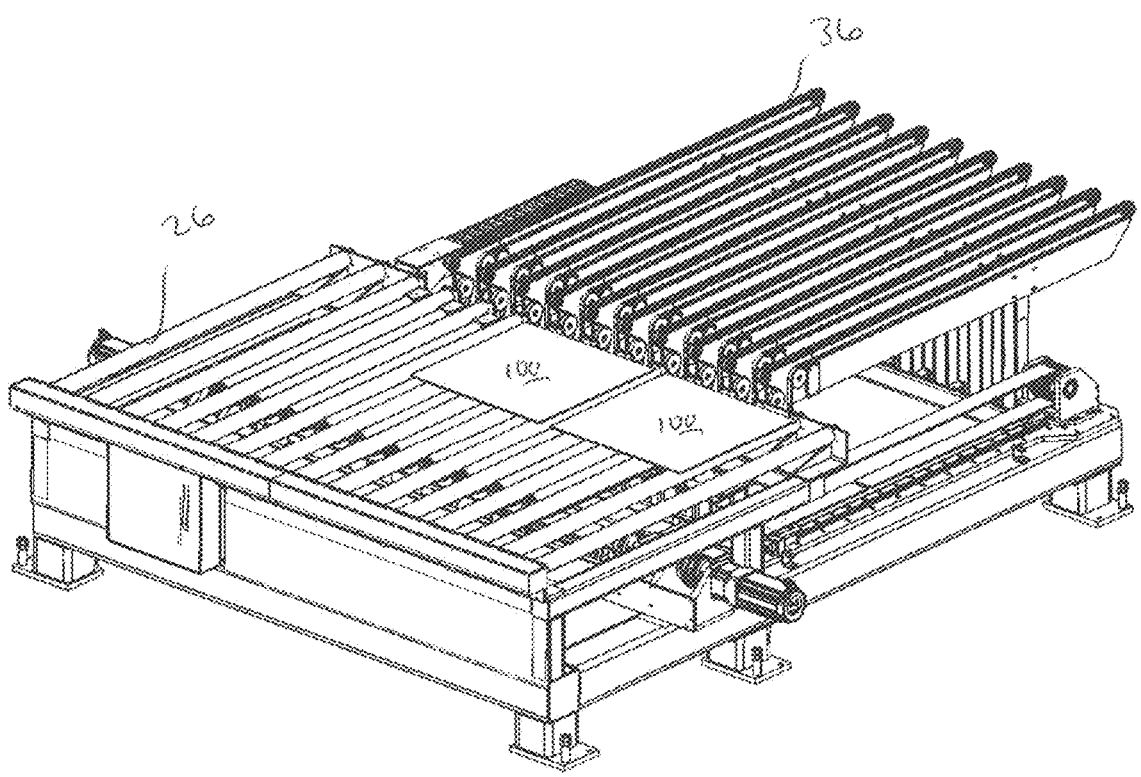
FIG. 23 is a perspective view of the system of FIG. 22, showing the two sheets further along the first conveyor line.
Figure 24:
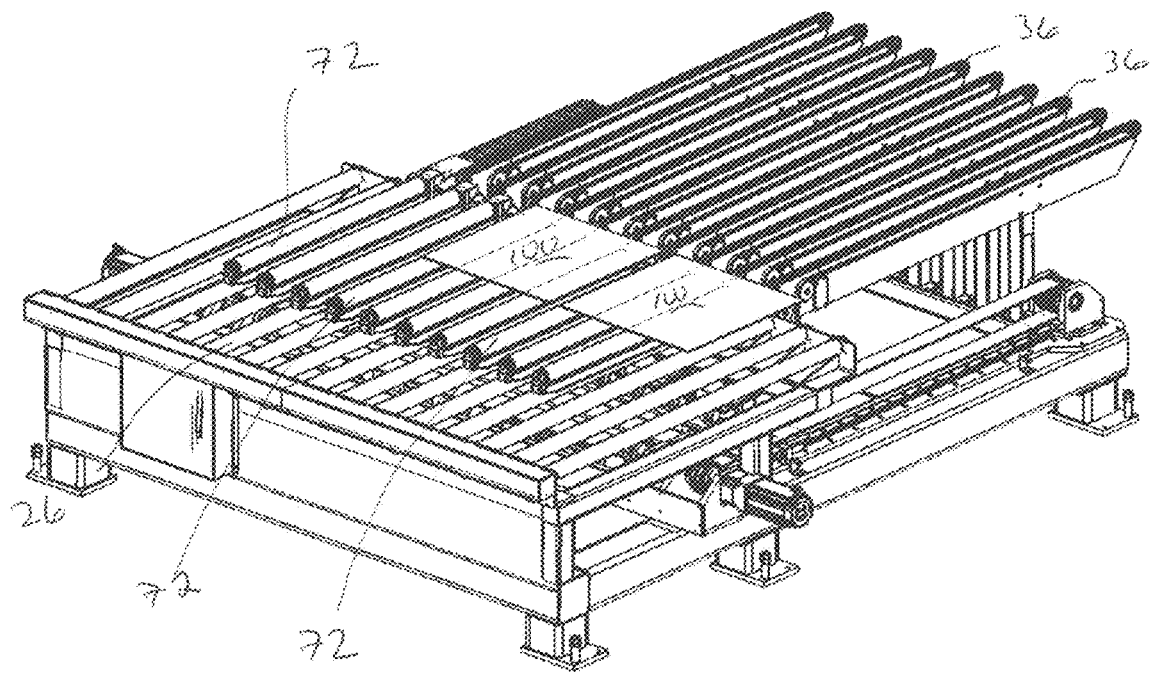
FIG. 24 is a perspective view of the system of FIG. 23, showing the two sheets lifted by the shuttle system in accordance with certain embodiments of the present invention.
Figure 25:
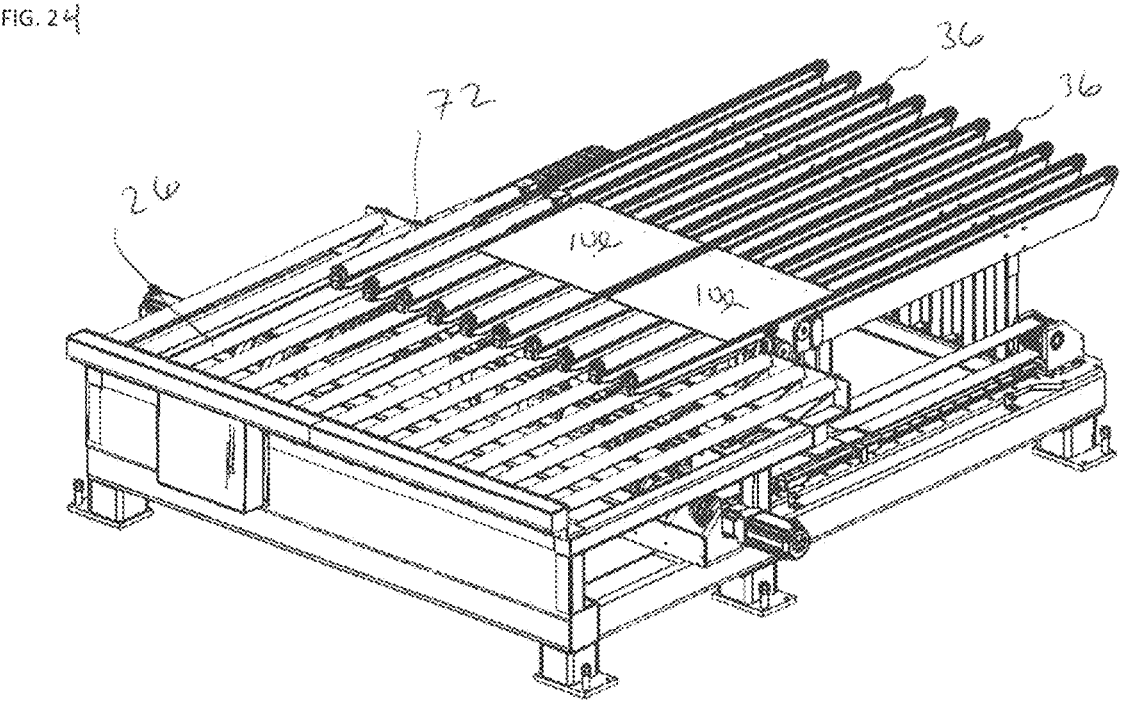
FIG. 25 is a perspective view of the system of FIG. 24, showing the two sheets lifted by the shuttle system and the shuttle system translated towards its second location in accordance with certain embodiments of the present invention.
Figure 26:
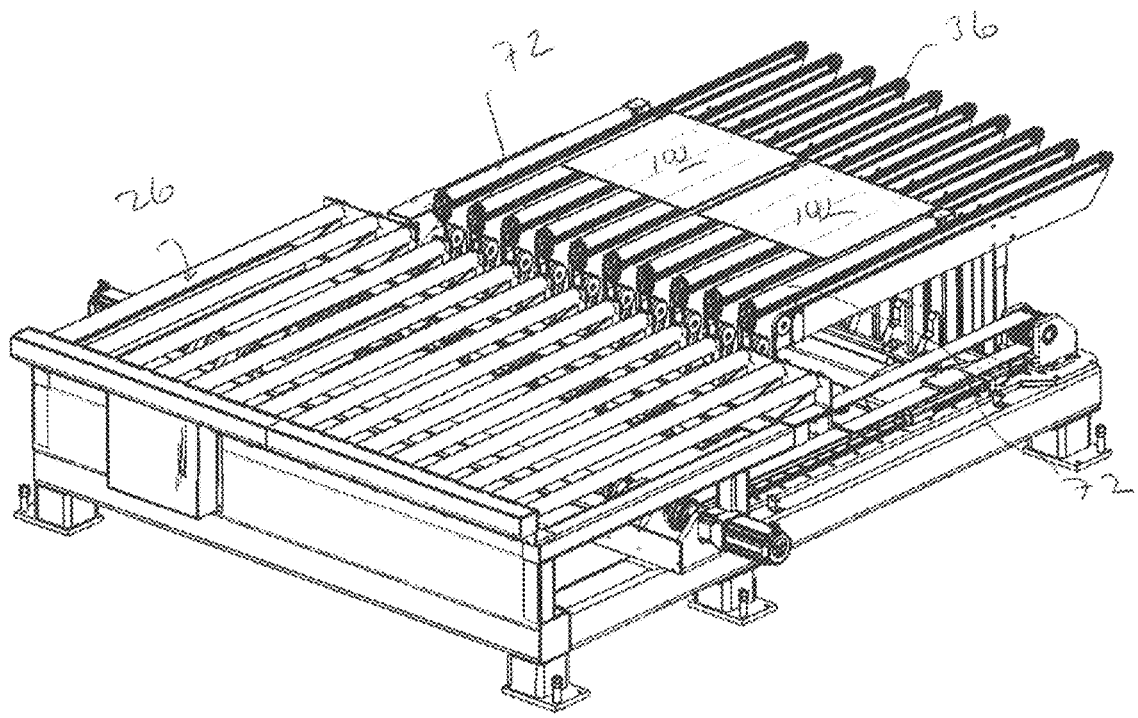
FIG. 26 is a perspective view of the system of FIG. 25, showing the shuttle system in a third state or position with the two sheets located over the second conveyor line in accordance with certain embodiments of the present invention.
Figure 27:
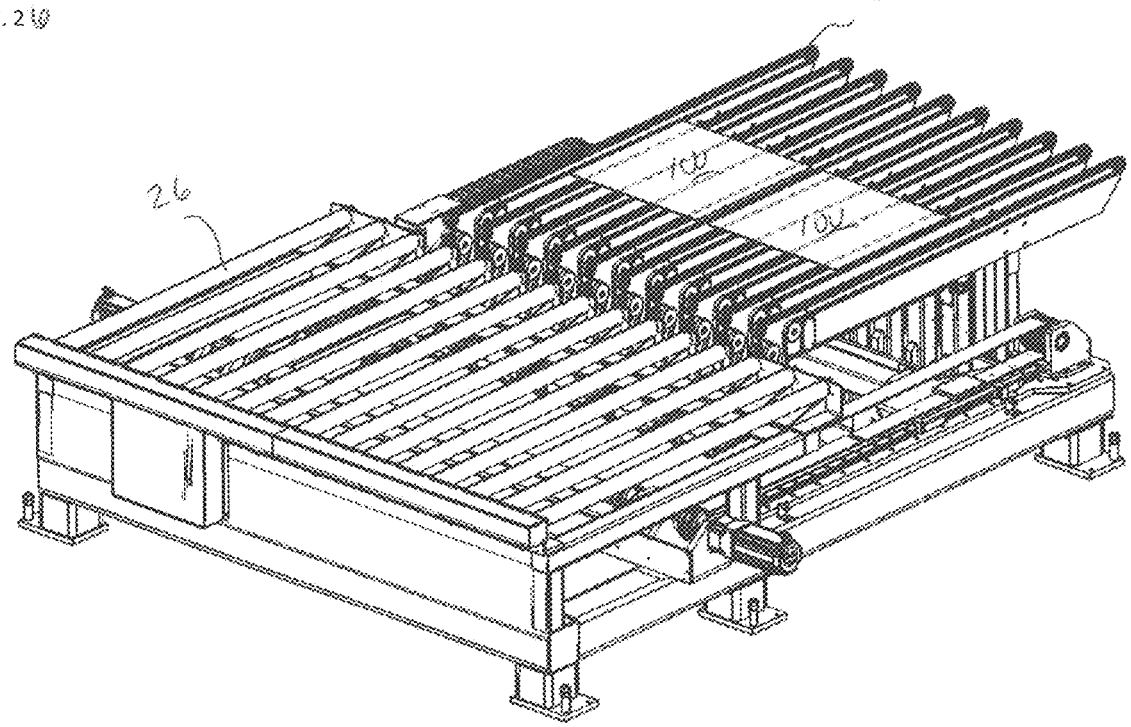
FIG. 27 is a perspective view of the system of FIG. 26, showing the sheets located on the second conveyor line with the shuttle system in a fourth state or position in accordance with certain embodiments of the present invention.
Figure 28:
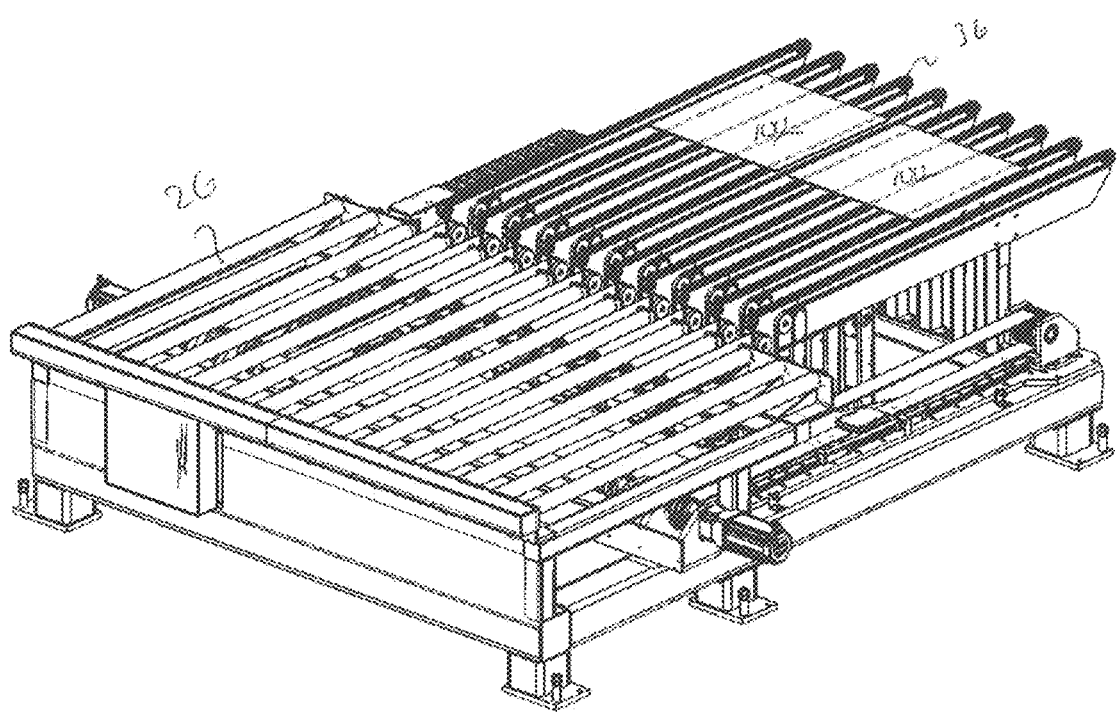
FIG. 28 is a perspective view of the system of FIG. 27, showing the sheets being conveyed in a second direction by the second conveyor line towards an unloading zone in accordance with certain embodiments of the present invention.

One embodiment of the invention will now be described and shown with two sheets 100 being processed by the system In FIG. 22, two sheets are being conveyed along the first conveyor line 20. (It will be appreciated that an upstream length of the first conveyor line is not shown here, and there may also be additional downstream length). The shuttle system 70 is in its first state, such that the lifting rollers 72 are in the retracted configuration at the first conveyor line 20. In FIG. 23, both sheets 100 have been conveyed further along the first conveyor line 20. Once the first and second sheets 100 trigger one or more detectors (not shown), the shuttle system 70 moves towards its second state, as shown in FIG. 24. That movement involves the lifting rollers 72 moving upwardly so as to lift the pair of sheets up off the transport rollers 26 of the first conveyor line 20. Preferably, the transport rollers 26 of the first conveyor line 20 continue to rotate, while the lifting rollers 72 of the shuttle system 70 also rotate so that the sheets roll along the lifting rollers 72 and thereby continue traveling in the first direction. Once the lifting rollers 72 reach their extended configuration as shown in FIG. 24, the shuttle system 70 translates the lifting rollers 72 toward a location over the second conveyor line 30. FIG. 25 shows the shuttle system 70 moving away from its second position and toward its third position. Here, a leading end region of each lifting roller is above the second conveyor line 30 while a trailing end region of each lifting roller 72 is above the first conveyor line 20. FIG. 26 shows the shuttle system 70 in its third position (or "third state"), such that the lifting rollers 72 are extended and above the second conveyor line 30. FIG. 27 shows the shuttle system in its fourth state, which results from the lifting rollers 72 moving downwardly so as to set the two sheets 100 down onto conveyor belts 36 of the second conveyor line 30. FIG. 28 shows the two sheets 100 then being conveyed away in the second direction.

Figure 29:
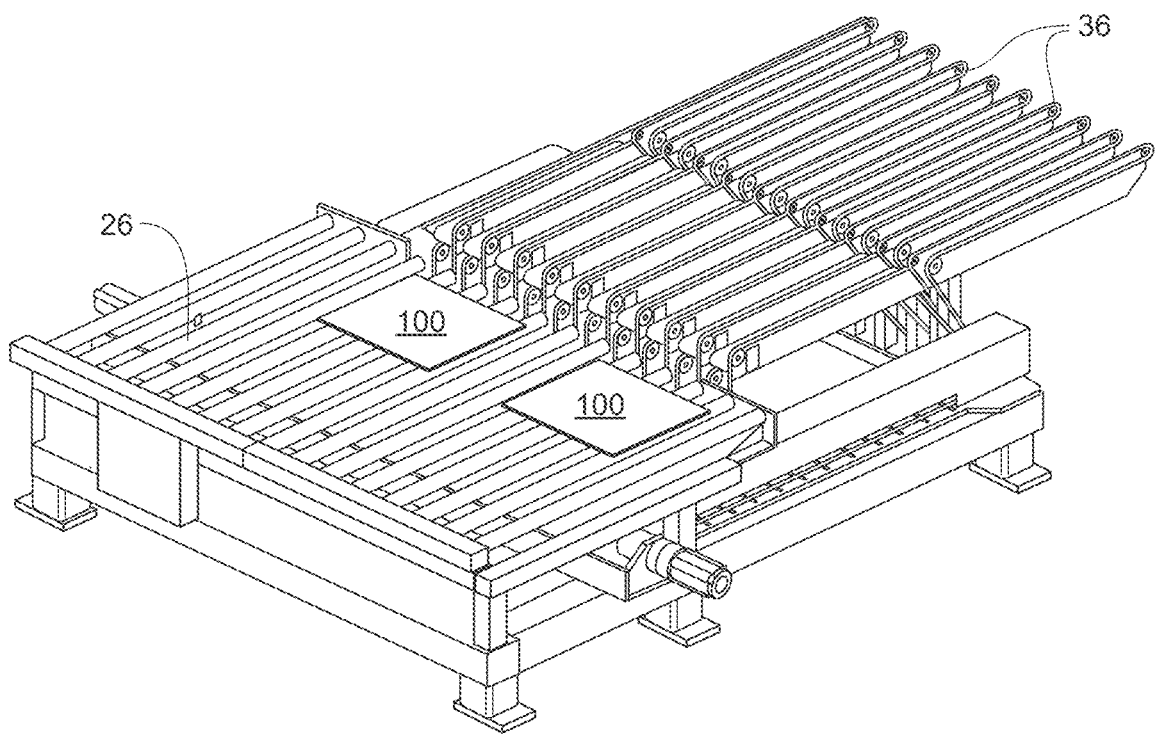
FIG. 29 is a perspective view of the system shown in FIG. 22 according to another preferred embodiment.
Figure 31:
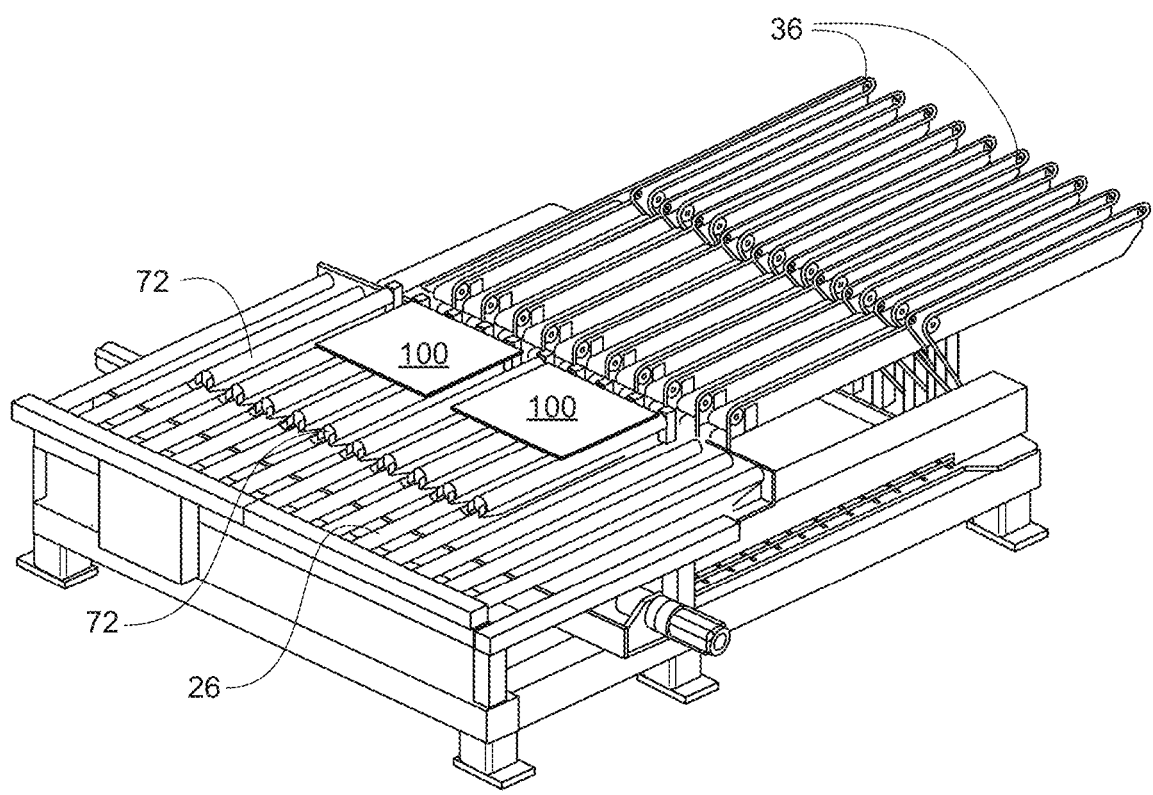
FIG. 31 is a perspective view of the system shown in FIG. 30, showing the two sheets lifted by the shuttle system and the shuttle system translated towards its second location in accordance with certain embodiments of the present invention.

In some examples, when multiple sheets are being transported on the first conveyor line 20 and those multiple sheets are to be transferred together onto the second conveyor line 30, the distance between the sheets may initially be rather large. FIGS. 29-31 illustrate this. As the lifting rollers 72 are being extended, the group of lifting rollers 72 supporting the first sheet are operated differently from the group of lifting rollers 72 on which the second sheet are supported. For example, the lifting rollers 72 under the first sheet may be reduced in rotational speed or no longer rotated, while the lifting rollers 72 supporting the second sheet continue to rotate so as to reduce the distance between the first and the second sheets. This can be done, if desired, in order to deliver the two sheets onto the second conveyor line 30 in a more closely spaced arrangement. More generally, by grouping the lifting rollers 72 into two independently controlled zones, it is possible to adjust the positions of one or more sheets before they are set onto the second conveyor line 30. It is to be appreciated, however, that providing multiple lifting roller zones of this nature is by no means required.

Figure 33:
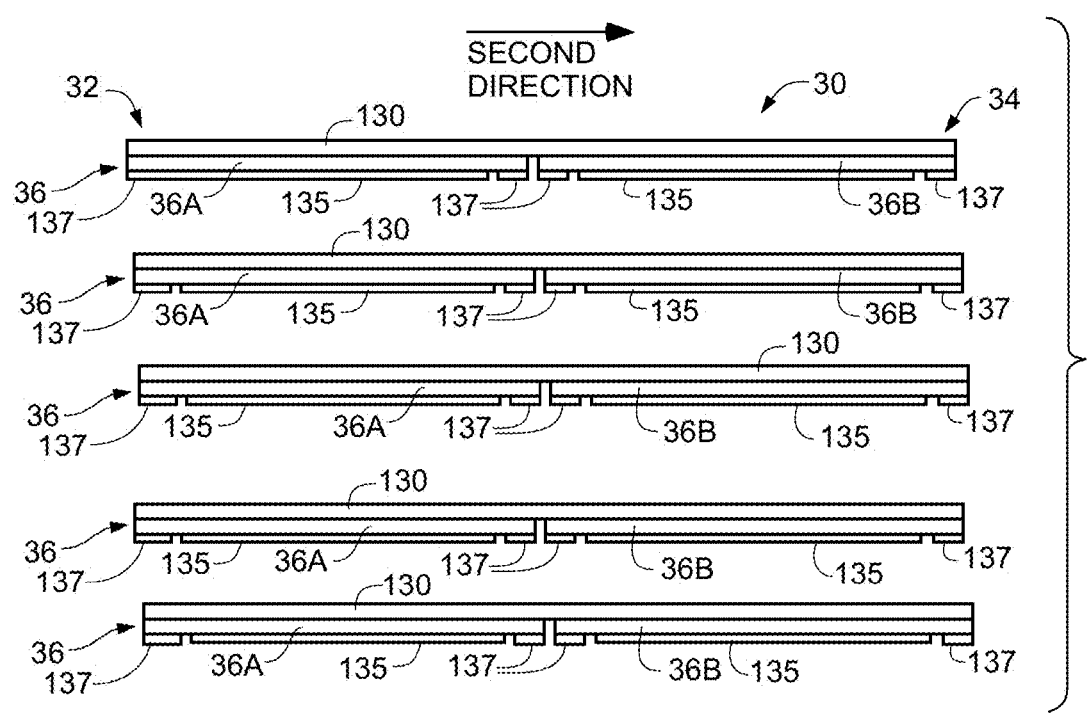
FIG. 33 is a schematic top view of a second conveyor line that can be used in another embodiment of the invention.

The conveyor belts 36 of the second conveyor line 30 may consist of multiple conveyor belts elongated in the second direction. In some embodiments, the conveyor belts 36 are grouped into a plurality of zones. In an embodiment, there may be two zones: a proximal zone and a distal zone. One such example is shown in FIG. 33. The proximal zone is formed by one conveyor belt system including a plurality of conveyor belts 36A proximal to the first conveyor line 20 and the distal zone is formed by another conveyor belt system including a plurality of conveyor belts 36B located distal to the first conveyor line 20. Thus, in this embodiment, the proximal zone is closer to the first conveyor line 20 than is the distal zone. The conveyor belts 36 of the proximal zone are configured to be operated independently of the conveyor belts 36 of the distal zone. For example, one zone may be operated at a faster speed than the other zone, or one zone may rotate while the other zone remains stationary. This may be advantageous, for example, if it is desirable to temporarily hold one or more sheets on the distal zone of the second conveyor line 30 while one or more other sheets are still being transferred by the shuttle system from the first conveyor line 20 to the proximal zone of the second conveyor line 30.

In the non-limiting example of FIG. 33, the conveyor belts 36 of the second conveyor line 30 are grouped into two zones. The first zone (or "proximal zone") comprises a plurality of first conveyor belts 36A, and the second zone (or "distal zone") comprises a plurality of second conveyor belts 36B. Furthermore, the first conveyor belts 36A are driven independently from the second conveyor belts 36B. It is therefore possible to use the shuttle system to place a glass sheet onto the first conveyor belts 36A and to rotate the first conveyor belts 36A so as to move the glass sheet to the second conveyor belts 36B. Once the glass sheet has thus been moved onto the second conveyor belts 36B, there is an option to stop rotation of the second conveyor belts 36B, thereby staging the glass sheet in a stationary position on the second conveyor belts 36B for a desired time while going ahead to load another glass sheet onto the first conveyor belts 36A. In the non-limiting example of FIG. 33, idler wheels 137 and trays 135 are mounted on elongated support beams 130.

Furthermore, in certain embodiments the lifting rollers 72 are grouped into multiple zones where each zone is independently operable and the conveyor belts of the second conveyor line 30 are also grouped into multiple zones that are controlled independently.

Figure 32:
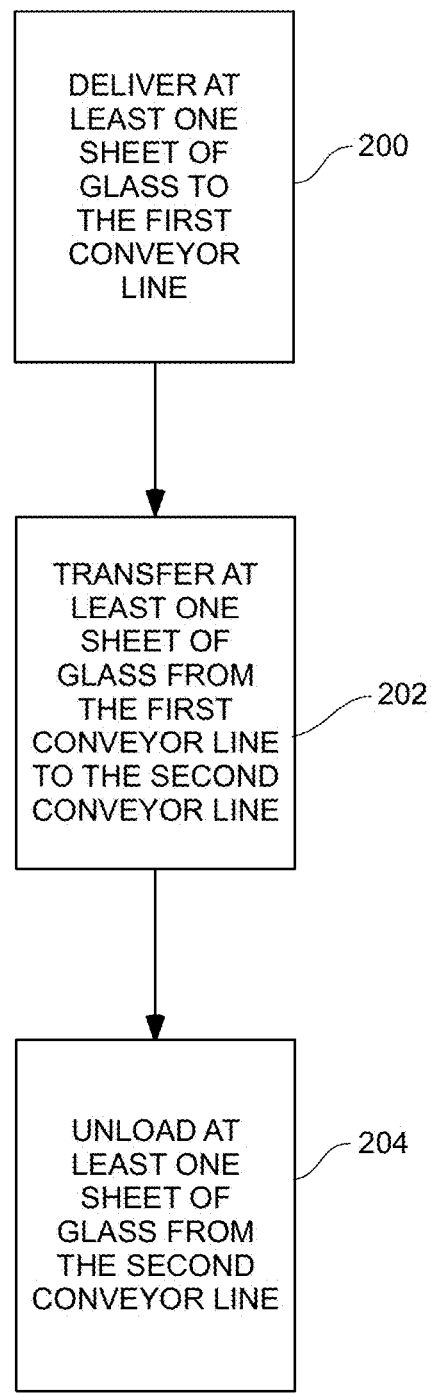
FIG. 32 is a flow chart showing the operation of the shuttle system in accordance with certain embodiments.

FIG. 32 is a flow chart describing the operation of a preferred embodiment of the system. At step 200, at least one sheet is delivered from a tempering furnace to a first conveyor line 20, where it travels in a first direction. At step 202, the at least one sheet is transferred from the first conveyor line to a second conveyor line 30, which is preferably located crosswise to the first conveyor line 20. The at least one sheet travels along the second conveyor line 30 in a second direction, and at step 204, the at least one sheet is unloaded from the second conveyor line 30.

Various examples have been described. These and other examples are within the scope of the following claims.

What is claimed is:

1. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line, wherein the shuttle system is movable linearly between a first location and a second location, such that when the shuttle system is in the first location, the lifting rollers are configured to move from the retracted configuration to the elevated configuration and thereby lift a glass sheet off the transport rollers of the first conveyor line, and when the shuttle system is moved from the first location to the second location, the lifting rollers are configured to move from the elevated configuration to the retracted configuration and thereby set the glass sheet onto the conveyor belts of the second conveyor line.

2. The glass conveyor system of claim 1 wherein the conveyor belts of the second conveyor line are at a higher elevation than the transport rollers of the first conveyor line.

3. The glass conveyor system of claim 2 wherein the lifting rollers when in the elevated configuration are at a higher elevation than the conveyor belts of the second conveyor line.

4. The glass conveyor system of claim 1 wherein the lifting rollers are configured to rotate while moving from the retracted configuration to the elevated configuration.

5. The glass conveyor system of claim 4 wherein one or more of the lifting rollers are driven rollers.

6. The glass conveyor system of claim 1 wherein the lifting rollers are configured to rotate while moving from the retracted configuration to the elevated configuration, such that the glass sheet when thereby lifted off the transport rollers of the first conveyor line can roll along the lifting rollers so as to continue moving in the first direction during such lifting.

7. The glass conveyor system of claim 1 wherein each of a series of the transport rollers is received rotatably by first and second rotary bearings located respectively on first and second end supports, such that there is a series of second end supports and a gap region is located between each adjacent two of the second end supports, and each of the lifting rollers is disposed in a respective one of the gap regions.

8. The glass conveyor system of claim 1 wherein the shuttle system is configured to simultaneously transfer two glass sheets from the first conveyor line to the second conveyor line.

9. The glass conveyor system of claim 8 wherein the shuttle system is configured such that during the transfer: (a) a first of the two glass sheets can be restrained from rolling along the lifting rollers, while simultaneously (b) a second of the two glass sheets can roll along the lifting rollers so as to continue moving in the first direction.

10. The glass conveyor system of claim 1 wherein the first conveyor line is positioned to convey tempered glass sheets away from an upstream glass tempering furnace.

11. The glass conveyor system of claim 10 wherein the second conveyor line is positioned to convey tempered glass sheets toward an unloading zone where they are loaded onto an adjacent glass rack.

12. The glass conveyor system of claim 11 further comprising a vertical glass accumulator located between the second conveyor line and the unloading zone.

13. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line, wherein each of a series of the lifting rollers has: (a) a first end region that is disposed in a gap region between two adjacent transport rollers of the first conveyor line, and (b) a second end region that is disposed in a gap region between two adjacent conveyor belts of the second conveyor line.

14. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line wherein the shuttle system includes a plurality of support beams, each of the support beams being elongated and extending beneath a respective one of the lifting rollers, and each of the lifting rollers being mounted on a respective one of the support beams wherein the shuttle system includes a plurality of support columns, the shuttle system comprising a plurality of cantilever assemblies, each of the cantilever assemblies comprising one of the lifting rollers, one of the support beams, and one of the support columns, each of the cantilever assemblies having opposed first and second ends, such that for each of the cantilever assemblies the first end is an unsupported end whereas one of the support columns is located at the second end.

15. The glass conveyor system of claim 14 comprising a plurality of drive shafts, each extending upwardly through a respective one of the support columns and configured to drive rotation of a respective one of the lifting rollers.

16. The glass conveyor system of claim 15 wherein the drive shafts are configured to drive rotation of the lifting rollers by virtue of each drive shaft having a gear intermeshed with a gear of a respective one of the lifting rollers.

17. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line wherein the shuttle system includes a plurality of support beams, each of the support beams being elongated and extending beneath a respective one of the lifting rollers, and each of the lifting rollers being mounted on a respective one of the support beams, wherein the shuttle system is configured to repeatedly cycle sequentially through first, second, third, and fourth positions, the shuttle system when in the first position having the lifting rollers in the retracted configuration adjacent the transport rollers of the first conveyor line, the shuttle system when in the second position having the lifting rollers in the extended configuration adjacent the transport rollers of the first conveyor line, the shuttle system when in the third position having the lifting rollers in the extended configuration adjacent the conveyor belts of the second conveyor line, and the shuttle system when in the fourth position having the lifting rollers in the retracted configuration adjacent the conveyor belts of the second conveyor line.

18. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line wherein the shuttle system includes a plurality of support beams, each of the support beams being elongated and extending beneath a respective one of the lifting rollers, and each of the lifting rollers being mounted on a respective one of the support beams, wherein the lifting rollers are grouped into first and second drive zones, the first drive zone comprising a first series of the lifting rollers, the second drive zone comprising a second series of the lifting rollers, the second drive zone being further downstream along the first conveyor line than the first drive zone, the first and second series of the lifting rollers being independently controllable such that the first series of the lifting rollers can be rotated at a desired speed while simultaneously the second series of the lifting rollers can either be rotated at a different speed or not rotated.

19. The glass conveyor system of claim 18 wherein the first and second series of the lifting rollers are operably coupled respectively with independent first and second drive systems.

20. A glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line wherein the shuttle system includes a plurality of support beams, each of the support beams being elongated and extending beneath a respective one of the lifting rollers, and each of the lifting rollers being mounted on a respective one of the support beams, wherein the plurality of conveyor belts of the second conveyor line is grouped into a first conveyance zone and a second conveyance zone, the first conveyance zone comprising a first series of the conveyor belts, the second conveyance zone comprising a second series of the conveyor belts, the first and second series of the conveyor belts being independently controllable such that the first series of the conveyor belts can be moved at a first speed while the second series of the conveyor belts is either moved at a different speed or not moved.

21. The glass conveyor system of claim 20 wherein the first and second series of the conveyor belts are operably coupled respectively with independent first and second drive systems.

22. A method of operating a glass conveyor system comprising a first conveyor line, a second conveyor line, and a shuttle system configured to transfer glass sheets from the first conveyor line to the second conveyor line, the first conveyor line comprising a plurality of transport rollers configured to convey glass sheets in a first direction, the second conveyor line comprising a plurality of conveyor belts configured to convey glass sheets in a second direction, the second direction being crosswise to the first direction, the shuttle system comprising a plurality of lifting rollers, the lifting rollers having a retracted configuration and an elevated configuration, such that the lifting rollers when in the elevated configuration are at a higher elevation than the transport rollers of the first conveyor line, the method comprising:
    (a) conveying a glass sheet along the first conveyor line in the first direction,
    (b) operating the shuttle system to transfer the glass sheet from the first conveyor line to the second conveyor line by:
        (i) moving the lifting rollers from the retracted configuration to the elevated configuration and thereby lifting the glass sheet off the transport rollers of the first conveyor line,
        (ii) moving the shuttle system from a first location to a second location, thereby moving the glass sheet from a position above the first conveyor line to a position above the second conveyor line, and
        (iii) moving the lifting rollers from the elevated configuration to the retracted configuration when the shuttle system is in the second location and thereby setting the glass sheet onto the conveyor belts of the second conveyor line, and
    (c) conveying the glass sheet along the second conveyor line in the second direction.

23. The method of claim 22 wherein the conveyor belts of the second conveyor line are at a higher elevation than the transport rollers of the first conveyor line, and said moving the lifting rollers from the retracted configuration to the elevated configuration lifts the glass sheet to a higher elevation than the conveyor belts of the second conveyor line.

24. The method of claim 22 wherein said moving the lifting rollers from the retracted configuration to the elevated configuration is performed while rotating the lifting rollers, such that the glass sheet when thereby lifted off the transport rollers of the first conveyor line rolls along the lifting rollers so as to continue moving in the first direction during such lifting.

25. The method of claim 24 wherein said rotating the lifting rollers involves operating a motor operably coupled with one or more of the lifting rollers so as to drive rotation of such one or more lifting rollers.

26. The method of claim 22 wherein the shuttle system includes a plurality of support beams and a plurality of support columns, each of the support beams being elongated and extending beneath a respective one of the lifting rollers, each of the lifting rollers being mounted on a respective one of the support beams, such that the shuttle system comprises a plurality of cantilever assemblies, each of the cantilever assemblies comprising one of the lifting rollers, one of the support beams, and one of the support columns, each of the cantilever assemblies having opposed first and second ends, such that for each of the cantilever assemblies the first end is an unsupported end whereas one of the support columns is located at the second end, and the shuttle system comprises a plurality of drive shafts each extending upwardly through a respective one of the support columns and being rotated to thereby drive rotation of a respective one of the lifting rollers.

27. The method of claim 26 wherein the method comprises rotating the drive shafts to thereby drive rotation of the lifting rollers by virtue of each drive shaft having a gear intermeshed with a gear of a respective one of the lifting rollers.

28. The method of claim 22 wherein the method comprises repeatedly cycling the shuttle system sequentially through first, second, third, and fourth positions, the shuttle system when in the first position having the lifting rollers in the retracted configuration adjacent the transport rollers of the first conveyor line, the shuttle system when in the second position having the lifting rollers in the extended configuration adjacent the transport rollers of the first conveyor line, the shuttle system when in the third position having the lifting rollers in the extended configuration adjacent the conveyor belts of the second conveyor line, and the shuttle system when in the fourth position having the lifting rollers in the retracted configuration adjacent the conveyor belts of the second conveyor line.

29. The method of claim 22 wherein said operating the glass conveyor system includes simultaneously transferring two glass sheets from the first conveyor line to the second conveyor line.

30. The method of claim 29 wherein during said simultaneously transferring the two glass sheets from the first conveyor line to the second conveyor line: (a) a first of the two glass sheets is restrained from rolling along the lifting rollers, while simultaneously (b) a second of the two glass sheets rolls along the lifting rollers so as to continue moving in the first direction.

31. The method of claim 22 wherein the lifting rollers are grouped into first and second drive zones, the first drive zone comprising a first series of the lifting rollers, the second drive zone comprising a second series of the lifting rollers, the second drive zone being further downstream along the first conveyor line than the first drive zone, the method comprising independently controlling the first and second series of the lifting rollers such that the first series of the lifting rollers is rotated at a desired speed while simultaneously the second series of the lifting rollers is either rotated at a different speed or not rotated.

32. The method of claim 22 wherein said conveying the glass sheet along the first conveyor line in the first direction involves moving the glass sheet away from an upstream glass tempering furnace, such that the glass sheet is a tempered glass sheet.

33. The method of claim 32 wherein said conveying the glass sheet along the second conveyor line in the second direction involves moving the glass sheet toward an unloading zone where it is loaded onto an adjacent glass rack.

34. The method of claim 33 wherein said conveying the glass sheet along the second conveyor line in the second direction also involves moving the glass sheet toward a vertical glass accumulator that is located between the second conveyor line and the unloading zone.

35. The method of claim 22 wherein the plurality of conveyor belts of the second conveyor line is grouped into a first conveyance zone and a second conveyance zone, the first conveyance zone comprising a first series of the conveyor belts, the second conveyance zone comprising a second series of conveyor belts, and the method includes moving the first series of the conveyor belts at a first speed while simultaneously either moving the second series of the conveyor belts at a different speed or not moving them.

36. The method of claim 35 wherein the first conveyance zone of the plurality of conveyor belts is closer to the first conveyor line than is the second conveyance zone of the plurality of conveyor belts, and the method includes temporarily holding one or more glass sheets stationary on the second series of the conveyor belts while transferring one or more other glass sheets from the first conveyor line to the first series of the conveyor belts using the shuttle system.

* * * * *